(12) United States Patent
Wise

(10) Patent No.: US 9,946,766 B2
(45) Date of Patent: Apr. 17, 2018

(54) SEARCH RESULT RELEVANCE BASED ON CONTENT ASSOCIATED WITH SOFTWARE APPLICATIONS

(71) Applicant: Samsung Electronics Co., Ltd., Suwon-si, Gyeonggi-do (KR)

(72) Inventor: Matthew Raymond Silva Wise, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 14/831,563

(22) Filed: Aug. 20, 2015

(65) Prior Publication Data

US 2017/0052956 A1  Feb. 23, 2017

(51) Int. Cl.
G06F 17/30 (2006.01)
(52) U.S. Cl.
CPC .... *G06F 17/3053* (2013.01); *G06F 17/30554* (2013.01); *G06F 17/30864* (2013.01)
(58) Field of Classification Search
CPC .......... G06F 17/3053; G06F 17/30554; G06F 17/30864
See application file for complete search history.

(56) References Cited

U.S. PATENT DOCUMENTS

| 2007/0208746 | A1* | 9/2007 | Koide | G06F 21/6218 707/999.009 |
| 2011/0072001 | A1 | 3/2011 | Basu et al. | |
| 2013/0290344 | A1 | 10/2013 | Glover et al. | |
| 2014/0052683 | A1 | 2/2014 | Kirkham et al. | |
| 2014/0201179 | A1* | 7/2014 | Chang | G06F 17/30864 707/706 |
| 2014/0236919 | A1* | 8/2014 | Liu | G06F 17/30864 707/710 |
| 2014/0358958 | A1* | 12/2014 | Mandic | G06F 17/30864 707/769 |

(Continued)

FOREIGN PATENT DOCUMENTS

KR  20130066672 A  6/2013

OTHER PUBLICATIONS

PCT International Search Report and Written Opinion for PCT Application No. PCT/IB2016/055017, dated Dec. 9, 2016, 8 pages.

*Primary Examiner* — Khanh B Pham
(74) *Attorney, Agent, or Firm* — Jefferson IP Law, LLP

(57) ABSTRACT

Techniques include receiving a search query from a user device, determining native application states that are accessible by a user of the user device, and identifying application state records based on the search query and the application states. Each application state record includes an application access mechanism (AAM) and application state information (ASI). The AAM references a native application and indicates operations for the application to perform. The ASI describes a state of the native application after the application has performed the operations. Identifying the application state records based on the application states includes determining that the ASI included in each record describes one of the application states. The techniques also include selecting AAMs from the identified application state records and transmitting the AAMs to the user device. Additional techniques include generating result scores for application state records identified based on the search query using the application states.

26 Claims, 12 Drawing Sheets

(56) References Cited

U.S. PATENT DOCUMENTS

2014/0365462 A1* 12/2014 Chang .............. G06F 17/30864
　　　　　　　　　　　　　　　　　　　　707/711
2015/0193546 A1　　7/2015　Lipton et al.

* cited by examiner

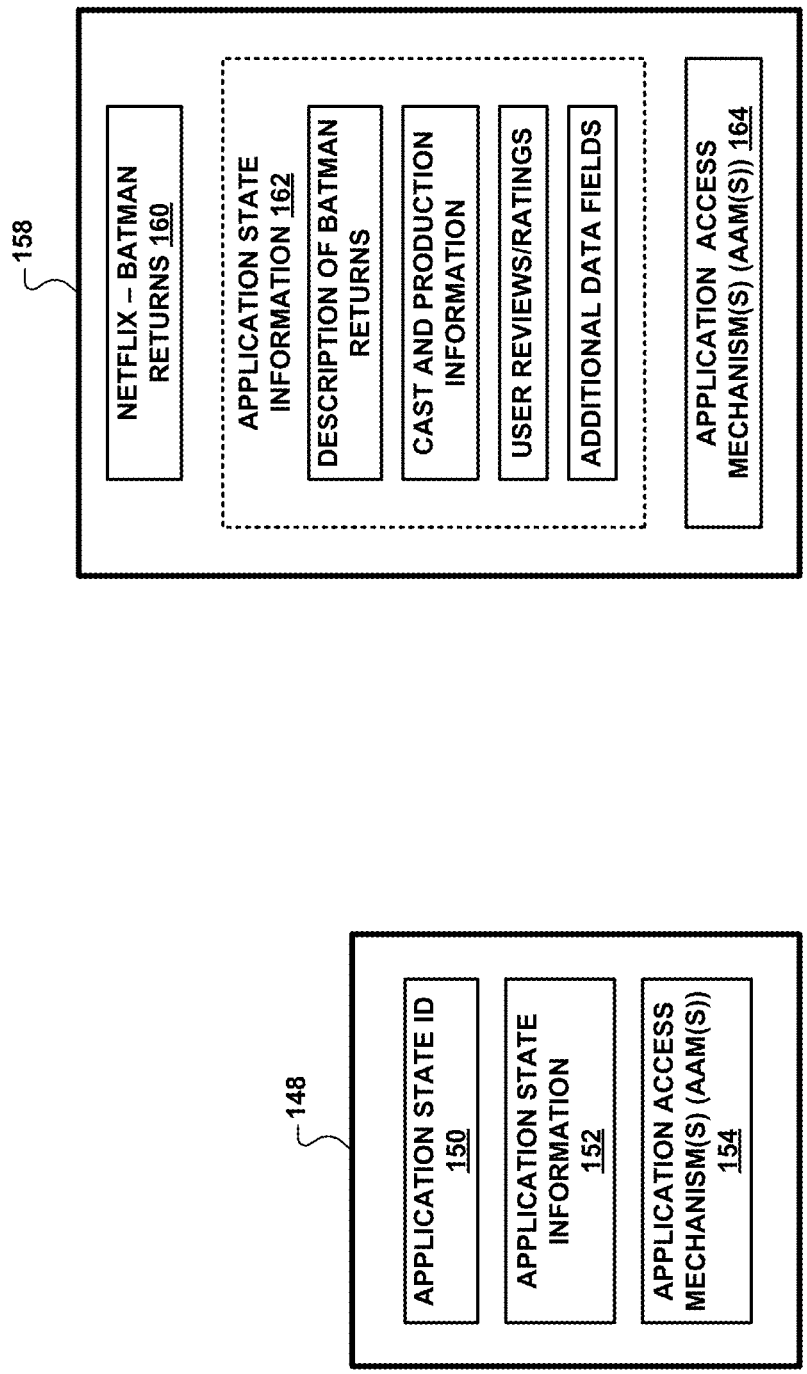

SEARCH RESULT RELEVANCE BASED ON CONTENT ASSOCIATED WITH SOFTWARE APPLICATIONS

TECHNICAL FIELD

This disclosure generally relates to the field of search, and more particularly to techniques for generating search results that correspond to states within software applications.

BACKGROUND

In recent years, the use of computers, smartphones, and other Internet-connected computing devices has grown significantly. Correspondingly, the number of software applications (apps) available for such computing devices has also grown. Today, many diverse apps can be accessed on a number of different computing devices, including, but not limited to, smartphones, personal computers, automobiles, and televisions. These apps can include business driven apps, games, educational apps, news apps, shopping apps, messaging apps, media streaming apps, and social networking apps, as some examples. Because of the large number of apps available today and the wide range of functionality they provide, computing device users often require the ability to search for and access specific app functionality.

SUMMARY

In one example, a method includes receiving a search query from a user device, determining one or more native application (app) states that are accessible by a user of the user device, and identifying one or more app state records based on the search query and based on the one or more native app states. Each app state record includes an app access mechanism (AAM) and app state information (ASI). The AAM references a native app and indicates one or more operations for the native app to perform. The ASI describes a state of the native app after the native app has performed the one or more operations. In this example, identifying the one or more app state records based on the one or more native app states includes determining that the ASI included in each app state record describes one of the one or more native app states. The method also includes selecting one or more AAMs from the identified one or more app state records, and transmitting the selected one or more AAMs to the user device.

In another example, a method includes receiving a search query from a user device, and identifying one or more app state records based on the search query. Each app state record includes an AAM and ASI. The AAM references a native app and indicates one or more operations for the native app to perform. The ASI describes a state of the native app after the native app has performed the one or more operations. The method further includes determining one or more native app states that are accessible by a user of the user device, generating a result score for each of the identified one or more app state records based on whether the ASI included in the app state record describes one of the one or more native app states, ordering the identified one or more app state records based on the one or more result scores, and selecting one or more app state records from the ordered one or more app state records. The method also includes selecting one or more AAMs from the selected one or more app state records, and transmitting the selected one or more AAMs to the user device.

In another example, a method includes transmitting, using a user device, a search query to a search system configured to generate search results in response to a received search query, and receiving search results from the search system at the user device in response to transmitting the search query. In this example, the search results include one or more AAMs that each reference a native app and indicate one or more operations for the native app to perform. Also in this example, the native app performing the one or more operations sets the native app into a state of the native app. The method further includes identifying, using the user device, one or more native app states that are accessible by a user of the user device. The method also includes, for each of the one or more AAMs, determining, using the user device, whether the native app referenced by the AAM performing the one or more operations indicated by the AAM sets the native app into any of the one or more native app states, and displaying the one or more AAMs at the user device based on the determination.

In another example, a system includes one or more computing devices configured to receive a search query from a user device, determine one or more native app states that are accessible by a user of the user device, and identify one or more app state records based on the search query and based on the one or more native app states. Each app state record includes an AAM and ASI. The AAM references a native app and indicates one or more operations for the native app to perform. The ASI describes a state of the native app after the native app has performed the one or more operations. In this example, to identify the one or more app state records based on the one or more native app states, the one or more computing devices are configured to determine that the ASI included in each app state record describes one of the one or more native app states. The one or more computing devices are also configured to select one or more AAMs from the identified one or more app state records, and transmit the selected one or more AAMs to the user device.

In another example, a system includes one or more computing devices configured to receive a search query from a user device, and identify one or more app state records based on the search query. Each app state record includes an AAM and ASI. The AAM references a native app and indicates one or more operations for the native app to perform. The ASI describes a state of the native app after the native app has performed the one or more operations. The one or more computing devices are further configured to determine one or more native app states that are accessible by a user of the user device, generate a result score for each of the identified one or more app state records based on whether the ASI included in the app state record describes one of the one or more native app states, order the identified one or more app state records based on the one or more result scores, and select one or more app state records from the ordered one or more app state records. The one or more computing devices are also configured to select one or more AAMs from the selected one or more app state records, and transmit the selected one or more AAMs to the user device.

In another example, a system includes one or more computing devices configured to transmit, using a user device, a search query to a search system configured to generate search results in response to a received search query, and receive search results from the search system at the user device in response to transmitting the search query. In this example, the search results include one or more AAMs that each reference a native app and indicate one or more operations for the native app to perform. Also in this example, the native app performing the one or more operations sets the native app into a state of the native app. The one or more computing devices are further configured to identify, using the user device, one or more native app states that are accessible by a user of the user device. The one or more computing devices are also configured to, for each of the one or more AAMs, determine, using the user device, whether the native app referenced by the AAM performing the one or more operations indicated by the AAM sets the native app into any of the one or more native app states, and display the one or more AAMs at the user device based on the determination.

In another example, a non-transitory computer-readable storage medium includes instructions that cause one or more computing devices to receive a search query from a user device, determine one or more native app states that are accessible by a user of the user device, and identify one or more app state records based on the search query and based on the one or more native app states. Each app state record includes an AAM and ASI. The AAM references a native app and indicates one or more operations for the native app to perform. The ASI describes a state of the native app after the native app has performed the one or more operations. In this example, the instructions that cause the one or more computing devices to identify the one or more app state records based on the one or more native app states include instructions that cause the one or more computing devices to determine that the ASI included in each app state record describes one of the one or more native app states. The instructions also cause the one or more computing devices to select one or more AAMs from the identified one or more app state records, and transmit the selected one or more AAMs to the user device.

In another example, a non-transitory computer-readable storage medium includes instructions that cause one or more computing devices to receive a search query from a user device, and identify one or more app state records based on the search query. Each app state record includes an AAM and ASI. The AAM references a native app and indicates one or more operations for the native app to perform. The ASI describes a state of the native app after the native app has performed the one or more operations. The instructions further cause the one or more computing devices to determine one or more native app states that are accessible by a user of the user device, generate a result score for each of the identified one or more app state records based on whether the ASI included in the app state record describes one of the one or more native app states, order the identified one or more app state records based on the one or more result scores, and select one or more app state records from the ordered one or more app state records. The instructions also cause the one or more computing devices to select one or more AAMs from the selected one or more app state records, and transmit the selected one or more AAMs to the user device.

In another example, a non-transitory computer-readable storage medium includes instructions that cause one or more computing devices to transmit, using a user device, a search query to a search system configured to generate search results in response to a received search query, and receive search results from the search system at the user device in response to transmitting the search query. In this example, the search results include one or more AAMs that each reference a native app and indicate one or more operations for the native app to perform. Also in this example, the native app performing the one or more operations sets the native app into a state of the native app. The instructions further cause the one or more computing devices to identify, using the user device, one or more native app states that are accessible by a user of the user device. The instructions also cause the one or more computing devices to, for each of the one or more AAMs, determine, using the user device, whether the native app referenced by the AAM performing the one or more operations indicated by the AAM sets the native app into any of the one or more native app states, and display the one or more AAMs at the user device based on the determination.

BRIEF DESCRIPTION OF DRAWINGS

The details of one or more examples are set forth in the accompanying drawings and the description below. Other features, objects, and advantages will be apparent from the description and drawings, and from the claims.

FIGS. 5A and 5B illustrate example app state records.

FIGS. 7A-8C depict example graphical user interfaces (GUIs) that may be generated on a user device according to the present disclosure.

DETAILED DESCRIPTION

Figure 1:
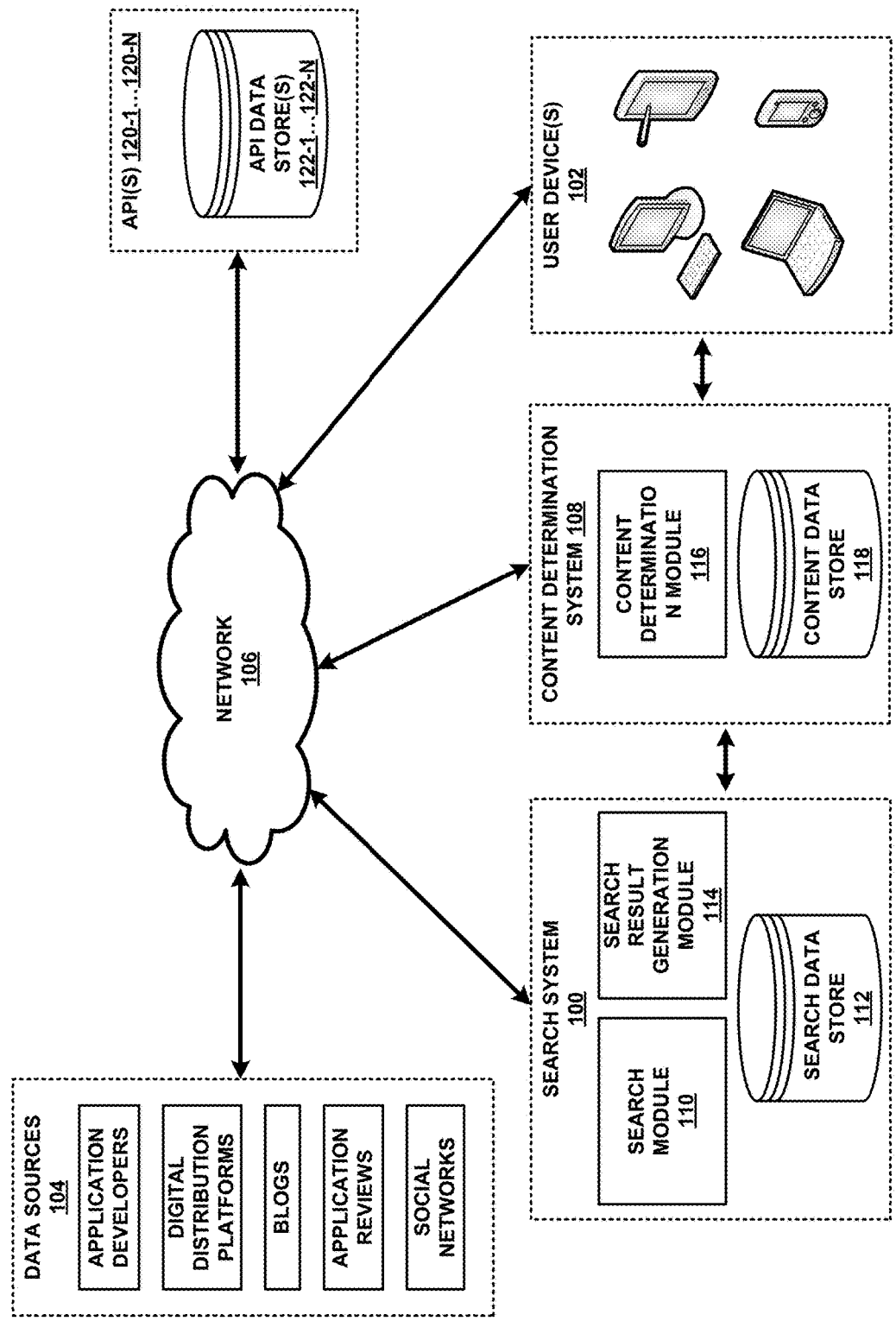
FIG. 1 illustrates an example environment that includes a search system, a content determination system, one or more user devices, one or more data sources, and one or more application (app) programming interfaces (APIs) that communicate via a network.

The figures and the following description relate to example implementations by way of illustration only. It should be noted that from the following discussion, alternative implementations of the structures and methods disclosed herein may be readily recognized as viable alternatives that may be employed without departing from the scope of this disclosure.

The present disclosure generally relates to the field of search, and, more particularly, to techniques for generating and displaying search results at a computing device based on content (e.g., media) of software applications (apps) associated with a user of the device. Using the techniques described herein may, in some examples, improve search result relevance and enhance user experience. According to the disclosed techniques, a user of a user device may have access to one or more app states of one or more native apps (e.g., any native apps that are either installed or not installed on the user device). In this example, each app state may correspond to an entry in one of the native apps for any type of media (e.g., a song, a podcast, or other audio, a movie, a television show episode, or other video, a photograph, a picture, or another image) or document (e.g., a magazine article, an e-book, or other text, which may also include image data). For example, the app states may be accessible by the user in the native apps as a result of the user performing any combination of the following. As one example, the user may have access to each of one or more of the app states in one or more of the native apps by virtue of using (e.g., launching) the apps (e.g., without first creating a user account for, or registering with, each app). As another example, the user may have created a user account for (e.g., registered with) each of one or more of the native apps (e.g., for free, or for a fee), thereby gaining access to each of one or more of the app states in the apps. As still another example, the user may have obtained (e.g., purchased, or received free of charge) access to each of one or more of the app states in the corresponding one of the native apps (e.g., by first creating a free or paid user account for the app, or without using a user account associated with the app).

Consistent with the techniques described herein, the user may input a search query (e.g., a text string) into a search field of a search app executing on the user device. The user may then cause the user device (e.g., the search app) to transmit the search query to a search system. The search system may receive the search query from the user device. In some examples, the search system further determines the native app states that are accessible by the user using any of a variety of techniques. As one example, the search system may receive an indication of the native app states from the user device (e.g., along with the search query, or separately). As another example, the search system may retrieve the indication of the native app states from a data store (e.g., a content registry). As still another example, the search system may determine the native app states by interacting with other resources (e.g., app programming interfaces (APIs) associated with the corresponding native apps) using information (e.g., indications of the apps and associated user login credentials) received from the user device 102 or another location.

In these examples, upon receiving the search query from the user device and determining the native app states that are accessible by the user, the search system may generate one or more search results that each specifies an app state of a native app based on the search query. The search system may then filter the search results based on the determined native app states. In particular, the search system may generate the search results such that each result is both responsive to (e.g., provides a function described by) the search query and specifies one of the native app states that are accessible by the user. Alternatively, the search system may rank (e.g., order) the search results based on the native app states. Specifically, the search system may rank each search result based on whether the result specifies one of the native app states.

The search system may then transmit the filtered or ranked search results to the user device that generated the search query. The user device may receive the search results from the search system and display the results to the user (e.g., as one or more user selectable links). In some examples, the search system also transmits accessibility data associated with one or more of the search results to the user device (e.g., along with the results). The user device may use the accessibility data as part of displaying the search results to indicate to the user (e.g., via text and/or image data) whether the user has access to the corresponding one or more app states.

In other examples, the search system may receive the search query from the user device and generate search results that are responsive to the search query, in a similar manner as described above. The search system may then transmit the search results to the user device. The user device may receive the search results from the search system. In these examples, the user device may further determine the native app states that are accessible by the user (e.g., using internal and/or external resources). The user device may then display the search results to the user (e.g., as one or more user selectable links) based on the determined native app states. As one example, the user device may filter the search results based on the native app states (e.g., display only those of the results that specify any of the native app states), in a similar manner as described above with reference to the search system. As another example, the user device may rank the search results based on the native app states (e.g., order each result based on whether the result specifies any of the native app states), as also previously described with reference to the search system. In some examples, the user device displays the filtered or ranked search results such that each of one or more of the results indicates to the user (e.g., via text and/or image data) whether the user is able to access the corresponding app state.

In the examples provided above, the user may select one or more of the filtered or ranked search results (e.g., one or more of the associated user selectable links) on the user device. Upon the user selecting a search result (e.g., an associated user selectable link), the user device may launch the corresponding native app and set the app into an app state specified by the selected result (e.g., by the selected user selectable link). The user may then interact with the app state on the user device (e.g., preview and/or perform a function provided by the app state). In additional examples, upon the user selecting the search result, the user device may download and install the native app. After installing the native app, the user device may launch the app and set the app into the app state specified by the selected result, in a similar manner as described above. In further examples, upon the user selecting the search result, the user device may launch a web browser app and access an app state of a web-based app. In this example, the web-based app state may be equivalent (e.g., analogous) to the app state of the native app described above.

In this manner, the techniques described herein may improve search result relevance and enhance user experience. As one example, by generating the search results using both the search query and the determination of the native app states that are accessible by the user, the techniques may improve search result relevance. Specifically, by identifying only app states of native apps that both match the search query and are accessible to the user, the search results may be more relevant to the user than search results generated using the search query alone. Additionally, by ranking app states of native apps identified using the search query such that app states that are accessible by the user are ranked higher than other app states, those of the search results that are more relevant to the user may be displayed earlier than other search results. As another example, by limiting the search results to those that specify app states that are accessible to the user, or by ranking the results based on whether the user is able to access the corresponding app states, the results may enable the user to more easily access the functionality provided by the results, thereby enhancing the user's experience.

FIG. 1 is a functional block diagram that illustrates an example environment including a search system 100, a content determination system 108, one or more user devices 102, one or more data sources 104, and one or more APIs (e.g., servers) 120 (e.g., API(s) 120-1 . . . 120-N) that communicate via a network 106. The network 106 through which the above-described systems, devices, and APIs communicate may include any type of network, such as a local area network (LAN), a wide area network (WAN), and/or the Internet. As shown in FIG. 1, the search system 100 includes a search module 110, a search result generation module 114, and a search data store 112, which are described in greater detail below. As further shown, the content determination system 108 includes a content determination module 116 and a content data store 118, which are also described in greater detail below. In some examples, the content determination system 108 is a part of the search system 100, a part of any of the user device(s) 102, a part of another system or device, or a stand-alone system or device. As also shown, each of the API(s) 120 includes an API data store 122 (e.g., one of one or more API data stores 122-1 . . . 122-N), which are also described in greater detail below.

In the example of FIG. 1, the search system 100 receives a search query (e.g., a text string) from one of the user device(s) 102. As described herein, a user of the user device 102 may input the search query into the user device 102. In some examples, the search system 100 (e.g., the content determination system 108) further determines one or more native app states that are each accessible by the user. As described herein, each native app state may correspond to an entry in any native app (e.g., a native app that is installed or not installed on the user device 102) for any type of media (e.g., a song, a podcast, or other audio, a movie, a television show episode, or other video, a photograph, a picture, or another image) or document (e.g., a magazine article, an e-book, or other text, which may also include image data). As also described herein, the native app states may be accessible to the user in the native apps by virtue of the user using any of the apps (e.g., without first creating a user account for each app), creating a user account for any of the apps (e.g., for free, or for a fee), and/or obtaining (e.g., for a fee, or free of charge) access to the states within the apps (e.g., after creating a free or paid user account for each app).

In some examples, the search system 100 determines the native app states that are accessible to the user by receiving an indication of the states from the user device 102 (e.g., directly, or via another system or device) and/or by retrieving the indication from a data store (e.g., a content registry). The indication may be referred to herein as content information. Additionally, or alternatively, the search system 100 (e.g., the content determination system 108) may determine the native app states by querying one or more APIs (e.g., one or more of the API(s) 120) associated with the corresponding native apps (e.g., using associated user login credentials, such as usernames and passwords). In this example, an API associated with a native app may refer to one or more (e.g., remote) servers that include data (e.g., within an API data store of the API) that is used by the app. For example, the search system 100 may query the APIs to access the native app states and/or to verify that the user has access to the states in the native apps. In some examples, the search system 100 determines the APIs associated with the native apps and, e.g., corresponding user login credentials, by retrieving information from the user device 102 and/or another location. The information may indicate APIs associated with native apps for which the user has obtained user accounts (e.g., having user login credentials), and/or for which no user account is required. In any case, in response to querying the APIs, the search system 100 may determine the native app states that are accessible by the user. The determined native app states may also be referred to herein as content information.

The search system 100 then generates one or more search results based on the search query and, e.g., based on the content information. Specifically, the search system 100 generates the search results using information included in one or more app state records stored in the search data store 112. As described herein, each app state record may specify an app state of a native app. The information included in the app state records may include one or more app access mechanisms (AAMs) that enable the user device(s) 102 to access the app states specified by the records. The search system 100 transmits the AAMs included in the app state records to the user device 102 as the search results, as described herein. The information may also include app state information (ASI) (e.g., text) and other data (e.g., app state identifiers (IDs)) associated with the app state records, which the search system 100 may use to identify the records in the search data store 112, as also described herein. As explained in greater detail below, to generate the search results, the search system 100 may identify one or more app state records included in the search data store 112 based on the search query. In some examples, the search system 100 further filters the identified app state records based on the content information. In a specific example, the search system 100 may select only those of the identified app state records that specify any of the native app states that are accessible by the user, as described herein. Alternatively, in other examples, the search system 100 may rank the identified app state records based on the content information. For example, the search system 100 may generate a result score (e.g., a value between 0 and 1) for each identified app state record based on whether the record specifies any of the native app states accessible by the user, as also described herein.

The search system 100 then transmits the (e.g., filtered or ranked) search results, including one or more AAMs selected from the identified app state records (and, e.g., the corresponding one or more result scores), to the user device 102 that generated the search query. The user device 102 receives the search results, including the AAMs, from the search system 100 and displays the results to the user as one or more user selectable links that include the AAMs. In implementations where the search results are not previously filtered or ranked based on the content information as previously described, the user device 102 may filter or rank the results (e.g., the user selectable links) using the content information, in a similar manner as described above. In these examples, the user device 102 (e.g., the content determination system 108) may determine the content information and display the search results based on the information by filtering or ranking the results (e.g., the user selectable links) as described above.

Figures 7A, 7B, 7C:
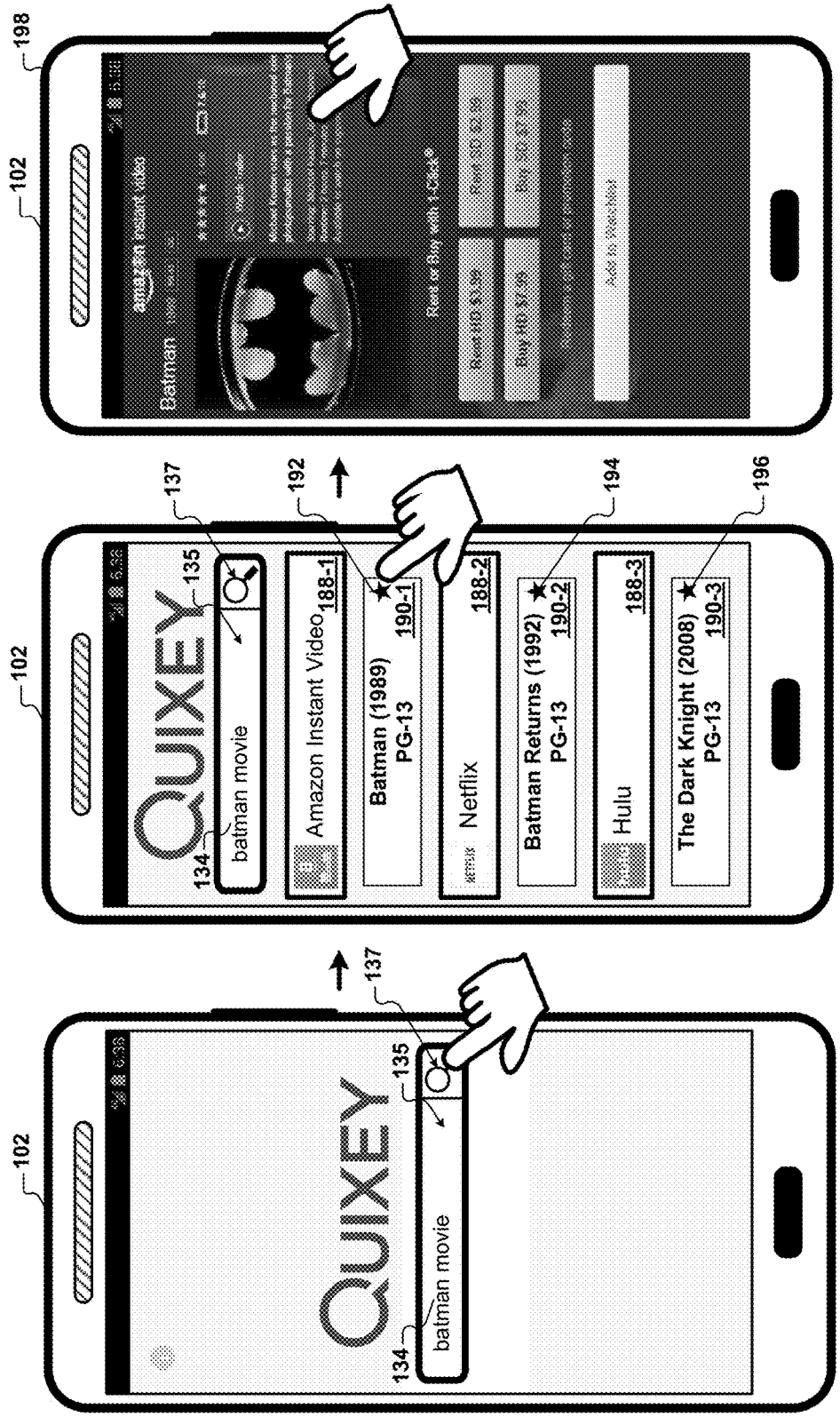
Figure 8C:
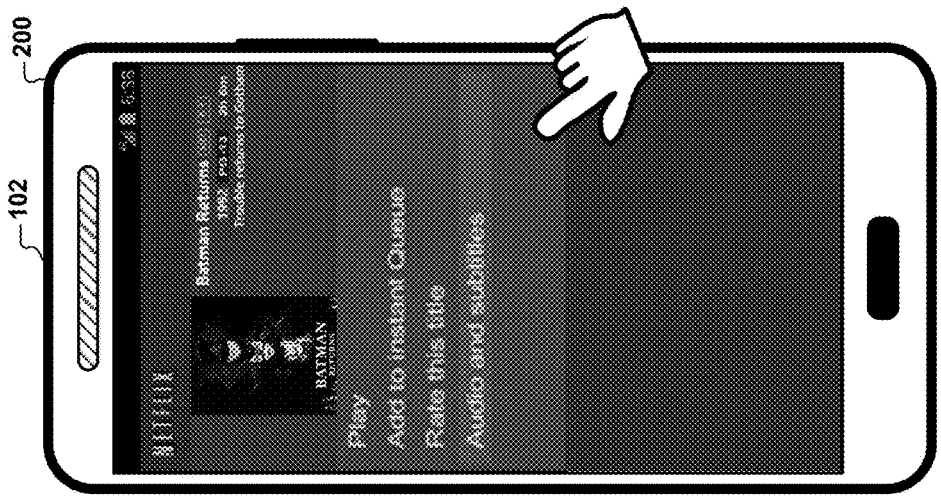
Figure 8B:
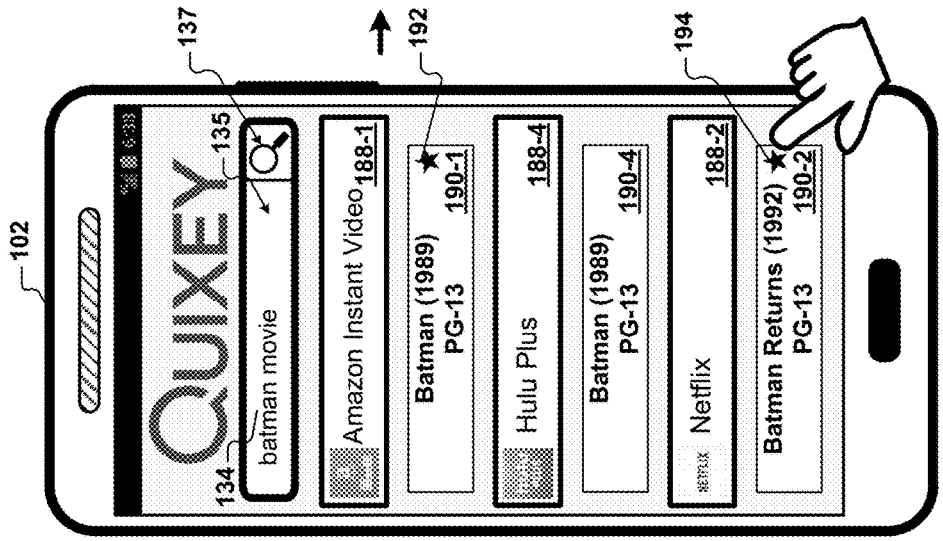

In some examples, the search system 100 transmits the search results, including the AAMs, to the user device 102 along with additional data. For example, the search system 100 may transmit link (e.g., text and/or image) data that the user device 102 may use to generate the user selectable links for the AAMs included in the search results. Each user selectable link may include text and/or image(s) that the user may select (e.g., touch, or "click on"). Each user selectable link may also be associated with one or more of the AAMs, such that when the user selects the link, the user device 102 launches a native app referenced by the AAMs and causes the app to perform one or more operations indicated by the AAMs. The text and/or image(s) of the user selectable link may indicate the operations or function that the native app performs in response to selection of the link. In other words, the text and/or image(s) may indicate an app state into which the native app is set upon performing the operations or function. For example, if the user selectable link is for a song in a native music player app, the text and/or image(s) may indicate that the user device 102 may launch the app and that the app may play the song when the user selects the link. Example user selectable links are shown in FIGS. 7B and 8B.

In other examples, the search system 100 may also transmit accessibility (e.g., text and/or image) data associated with one or more of the search results to the user device 102. The user device 102 may use the accessibility data to generate one or more of the user selectable links used to display the search results. For example, the accessibility data included in a given user selectable link may indicate to the user whether the app state specified by the link (e.g., by the corresponding search result) is accessible to the user. In other examples, the user device 102 may generate the accessibility data locally (e.g., by interacting with one or more other resources). Example user selectable links that include accessibility data are shown in FIGS. 7B and 8B.

In this disclosure, an app may refer to computer software that causes a computing device (e.g., one of the user device(s) 102) to perform a task. In some examples, an app is referred to as a "program." Example apps include word processing apps, spreadsheet apps, messaging apps, media streaming apps, social networking apps, and games. Apps can be executed on a variety of different computing devices, including mobile computing devices, such as smart phones, tablets, and wearable computing devices (e.g., headsets and/or smart watches). Apps can also be executed on other types of computing devices having other form factors, such as laptop computers, desktop computers, or other consumer electronic devices. In some examples, apps are installed on a computing device prior to a user purchasing the device. In other examples, the user may download and install apps on the computing device after purchasing the device. A native app, as used herein, may refer to an app that is installed and executed on a user device 102. In contrast, a web-based app may refer to an app that is accessible from a user device 102 via a web browser app included on the user device 102.

An AAM, as used herein, may be a string of one or more characters that references a native app and indicates one or more operations for a user device 102 (e.g., the app) to perform. If a user of the user device 102 selects a user selectable link that includes the AAM, the user device 102 may launch the native app referenced by the AAM and (e.g., cause the app to) perform the operations indicated by the AAM. In other words, the user selecting the user selectable link may cause the user device 102 to launch the native app and set the app into an app state (e.g., in which the app displays a GUI, or screen) that corresponds to the operations. As a result, the native app may be configured to display one or more products, services, or vendors, to the user, e.g., via a display device of the user device 102. In this manner, the AAM may specify the app state of the native app. The app state, in turn, may refer to the operations indicated by the AAM and/or the outcome of the native app performing the operations in response to the user selecting the user selectable link that includes the AAM on the user device 102.

An app state of a native app, as also used herein, may refer to one or more graphical user interfaces (GUIs), or so-called "screens," within the app. In general, an app state of this disclosure may refer to a configuration of a native app in which the app displays content to a user, such as information related to one or more products, services, or vendors provided by, or accessible via, the app. An app state may also refer to a function provided by a native app. For example, an app state of native online shopping app may correspond to a screen of the app that describes (e.g., using text and/or image data) a particular product or service sold through the app (e.g., by one or more vendors associated with the app).

As described herein, the search system 100 uses data included in the search data store 112 to generate search results based on search queries received from the user device(s) 102 and, e.g., based on content information determined by the search system 100. The search data store 112 may include one or more databases, indices (e.g., inverted indices), tables, files, or other data structures that may be used to implement the techniques of the present disclosure. In some examples, the search data store 112 is included in one or more storage devices. The search data store 112 includes one or more app state records. Each app state record may include data related to a function of a native app and/or to an app state of the app resulting from the app performing the function. For example, each app state record may include, among other content, an app state ID, ASI, and one or more AAMs. An app state ID of an app state record may uniquely identify the record among other app state records included in the search data store 112. ASI of an app state record may describe an app state into which an app is set according to one or more AAMs included in the record. An AAM of an app state record may include data (e.g., a text/number string) that causes a user device 102 to launch a native app and perform a function associated with the app. Example app state records are shown in FIGS. 5A and 5B.

As described herein, the search system 100 receives the search query from the user device 102 and generates the search results based on the search query and, e.g., based on the content information. The search query may include text, numbers, and/or symbols (e.g., punctuation) entered into the user device 102 by the user. For example, the user may have entered the search query into a search field, or "box," of a search app included on the user device 102. The user may have entered the search query using a touchscreen keypad, a mechanical keypad, and/or via speech recognition techniques and transmitted the search query to the search system 100 using the search app. In some examples, the user device 102 (e.g., the search app) also determines the content information and transmit the information to the search system 100, as described herein. For example, the user device 102 (e.g., the search app) may transmit the content information to the search system 100 along with the search query (e.g., as part of a query wrapper). In some examples, the search app is a native app dedicated to search, or a more general app, such as a web browser app. In other examples, the search system 100 may determine the content information (e.g., using data received from the user device 102 and/or independently of the user device 102), as also described herein. The content information may include any of text, numbers, and/or symbols (e.g., punctuation), as well as any machine-readable (e.g., binary) data used to represent the native app states that are accessible to the user.

In some examples, the user device 102 transmits additional data to the search system 100 along with the search query and, e.g., the content information. The search query and any additional data may be referred to herein as a query wrapper. The additional data may include geo-location data associated with the user device 102, platform data for the user device 102 (e.g., a type and/or a version of the user device 102, an operating system (OS), and/or a web browser app of the user device 102), an identity of the user (e.g., a username), partner specific data, and/or other data. The user device 102 may transmit the query wrapper to the search system 100. The search system 100 may receive the query wrapper and use the search query and, e.g., the additional data, to generate the search results in the manner described herein.

The user device(s) 102 may be any computing devices capable of providing search queries and, e.g., content information, to the search system 100 (and, e.g., the content determination system 108) and receiving search results from the search system 100. The user device(s) 102 may include any of smartphones, and tablet, laptop, or desktop computers. The user device(s) 102 may also include any computing devices having other form factors, e.g., computing devices included in vehicles, gaming devices, televisions, or other appliances (e.g., networked home automation devices and home appliances). The user device(s) 102 may use a variety of different operating systems or platforms (e.g., an OS 124 shown in FIG. 2). In an example where a user device 102 is a mobile device, the user device 102 may operate using an OS, such as ANDROID® by Google, Inc., IOS® by Apple, Inc., or WINDOWS PHONE® by Microsoft Corporation. In an example where the user device 102 is a laptop or desktop computing device, the user device 102 may use an OS, such as MICROSOFT WINDOWS® by Microsoft Corporation, MAC OS® by Apple, Inc., or LINUX® (LINUX® is the registered trademark of Linus Torvalds in the U.S. and other countries). The user device(s) 102 may interact with any of the systems 100, 108 using operating systems other than those described herein, whether presently available or developed in the future.

The user device(s) 102 can communicate with the search system 100 (and, e.g., the content determination system 108) via the network 106. In general, the user device(s) 102 may communicate with any of the systems 100, 108 using any app that can transmit search queries and, e.g., content information, to one or more of the systems 100, 108, and receive search results from the search system 100. In some examples, the user device(s) 102 includes an app that is dedicated to interfacing with one or more of the systems 100, 108, such as an app dedicated to searches (e.g., a search app). In other examples, the user device(s) 102 may communicate with any of the systems 100, 108 using a more general app, such as a web browser app. In any case, an app included on a user device 102 to communicate with one or more of the systems 100, 108 may include a GUI with a search field, or box, into which a user may enter search queries. For example, the user may enter the search queries using a touchscreen, a physical keyboard, a speech-to-text program, or another form of user input available on the user device 102. The app may be configured to transmit the search queries to the search system 100 (e.g., in response to user inputs). The app may also be configured to determine (e.g., via a content identification (ID) module) native app states that are accessible by the user, as described herein. The app may be further configured to transmit indications of this content information to one or more of the systems 100, 108 (e.g., with or without the search queries), as also described herein.

In some examples, the user device 102 uses the same (e.g., dedicated or more general) app to display the search results received from the search system 100 to the user. For example, the user device 102 may display the search results via the GUI used to receive the search queries from the user and transmit the search queries to one or more of the systems 100, 108, as described herein. The GUI may display the search results to the user in a variety of different ways, depending on the information transmitted by the search system 100 to the user device 102 as part of the search results. As previously described, the search results may include one or more AAMs along with result scores, link data, and/or other information (e.g. accessibility data) used to generate user selectable links for the AAMs. The GUI may display the search results to the user as a list of the user selectable links, including text and/or images. For instance, the text and/or images may include names of native apps referenced by the AAMs, descriptions of the AAMs and/or operations indicated therein (e.g., descriptions of the app states specified by the AAMs), and images associated with the apps or the app states specified by the AAMs (e.g., app, or app state, icons or "screens"). Additionally, for some or all of the user selectable links, the text and/or images may also indicate whether the user is able to access the corresponding app state(s), as described herein. In additional examples, the GUI may display the search results as the list of the user selectable links arranged under a search field, or box, into which the user entered a search query. For example, the GUI may arrange the user selectable links by result scores associated with the links, i.e., with the AAMs for which the links are generated, or using other logic. In still other examples, the GUI may also group the user selectable links by the associated native apps (e.g., using app headers).

The data source(s) 104 may be sources of data that the search system 100 may use to generate and/or update the search data store 112. For example, the search system 100 may use the data source(s) 104 to generate and/or update one or more databases, indices, tables, files, or other data structures (e.g., app state records) included in the search data store 112. As an example, the search system 100 may generate new app state records and/or update existing app state records based on data retrieved from the data source(s) 104. For instance, the search system 100 may include modules that generate new app state records and/or update existing app state records based on the data. In some examples, some or all of the data included in the search data store 112 (e.g., one or more app state records) is manually generated by a human operator.

The data source(s) 104 may include a variety of different data providers. For example, the data source(s) 104 may include data from app developers, such as app developer websites and data feeds provided by app developers. The data source(s) 104 may also include operators of digital distribution platforms configured to distribute apps to user devices. The data source(s) 104 may further include other websites, such as websites that include web logs (i.e., blogs), app reviews, or other data related to apps. Additionally, the data source(s) 104 may include social networking sites, such as "FACEBOOK®" by Facebook, Inc. (e.g., Facebook posts) and "TWITTER®" by Twitter, Inc. (e.g., text from tweets). The data source(s) 104 may also include online databases that include data related to movies, television programs, music, and restaurants. The data source(s) 104 may further include other types of data sources, which may have various types of content and update rates. In some examples, the search system 100 retrieves data from the data source(s) 104, including any type of data related to app functionality and/or app states. The search system 100 may then generate one or more app state records based on the data and store the records in the search data store 112. In other examples, some or all of the data (e.g., ASI) included in the app state records of the search data store 112 may be manually generated by a human operator. Additionally, in some examples, the data included in the app state records is updated over time so that the search system 100 provides up-to-date search results in response to user-specified search queries received from the user device(s) 102.

Figure 2:
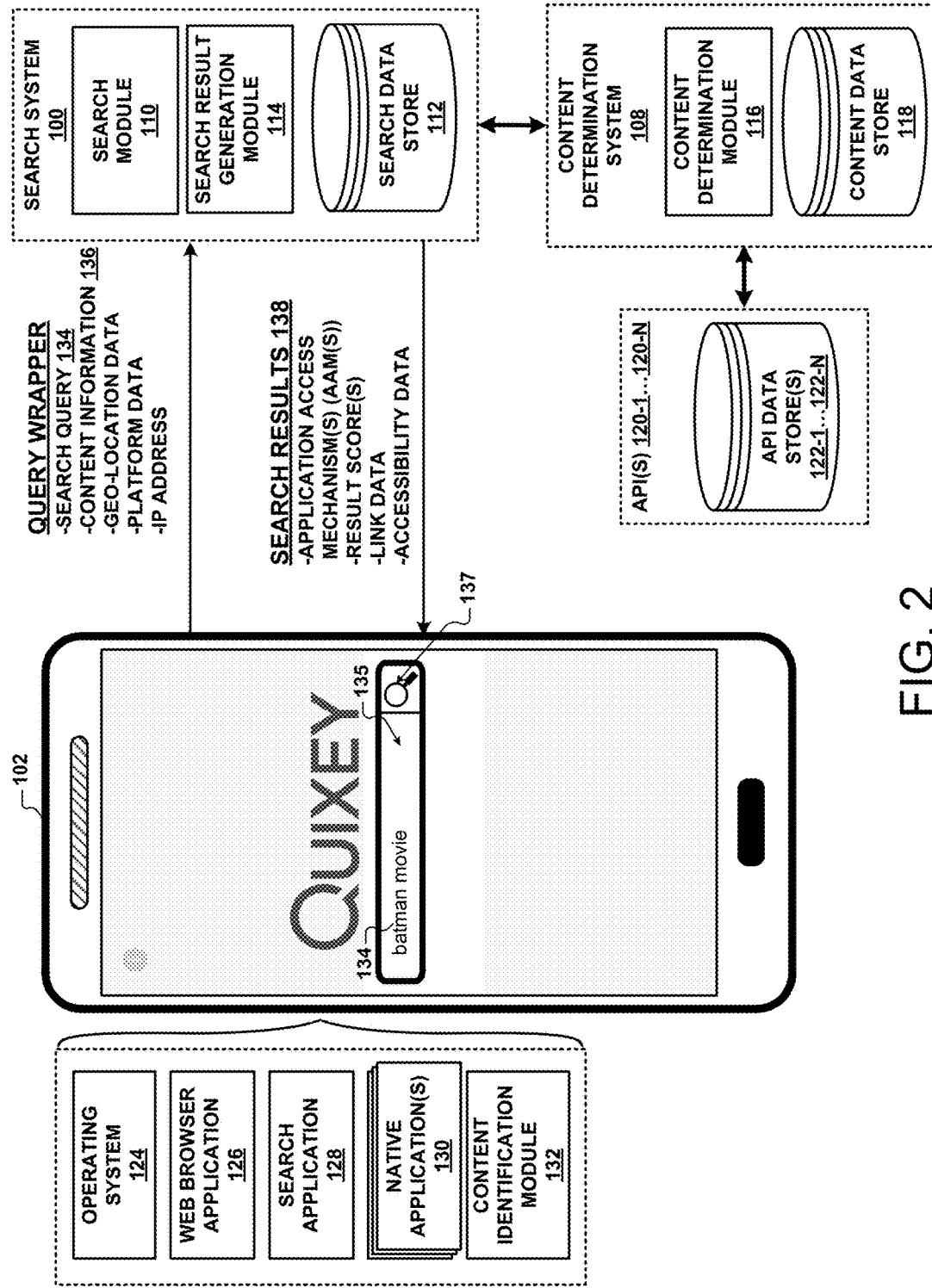
FIG. 2 illustrates an example of a user device in communication with a search system and a content determination system.

FIG. 2 illustrates an example of one of the user device(s) 102 in communication with the search system 100 and the content determination system 108. Specifically, FIG. 2 depicts example interactions and data exchanged among the user device 102, the search system 100, and the content determination system 108. As shown in FIG. 2, the user device 102 may transmit a query wrapper to the search system 100. The query wrapper may include a search query (e.g., a text string, such as "batman movie") 134 specified by a user of the user device 102. As described herein, the user may have entered the search query 134 into a search field 135 of a GUI of a search app 128 included on the user device 102. As explained herein, the search app 128 may be a native app (e.g., any of one or more native apps 130), or a web-based app (e.g., accessible via a web browser app 126) included on the user device 102. The user may have then submitted the search query 134 to the search system 100 (i.e., as part of the query wrapper) by selecting a search button 137 of the GUI. As further shown, the query wrapper may include additional information, such as any of geo-location data, platform data, and other data (e.g., an IP address) associated with the user, the user device 102, and/or the search query 134.

In the example of FIG. 2, the query wrapper may also include content information 136 indicating one or more app states of one or more native apps that are accessible by the user, as described herein. For example, the user device 102 (e.g. the search app 128) may have determined the native app states using a content ID module 132 also included on the user device 102 (e.g., as part of the search app 128). As one example, the content ID module 132 may have determined one or more of the app states by detecting the user obtaining access to the states in the corresponding one or more native apps (e.g., in any of the native app(s) 130, or in other native apps previously installed on the user device 102). As another example, the content ID module 132 may have determined one or more of the app states by directly accessing the corresponding one or more native apps (e.g., any of the native app(s) 130 using associated user login credentials). As still another example, the content ID module 132 may have determined one or more of the app states by accessing a memory location on the user device 102 and/or a data store (e.g., a content registry). As yet another example, the content ID module 132 may have determined one or more of the app states by querying (e.g., via the content determination system 108) one or more APIs (e.g., any of the API(s) 120-1 . . . 120-N) associated with the corresponding one or more native apps (e.g., using associated user login credentials). For example, the content ID module 132 may have determined the APIs associated with the native apps and, e.g., corresponding user login credentials, based on received information that indicates APIs associated with native apps for which the user has obtained user accounts (e.g., having user login credentials) and/or for which no user account is required. In some examples, the content ID module 132 determines the native app states prior to, during (e.g., in response to), or following the user entering and/or submitting the search query 134 using the search app 128.

In other examples, rather than receiving the content information 136 from the user device 102, the search system 100 (e.g., the content determination system 108) may determine the app states of the native apps that are accessible by the user. As one example, the search system 100 may retrieve the content information 136 from a data store (e.g., a content registry). For example, the user device 102 may have previously generated the content information 136 as described above and transmitted the information 136 to the data store. As another example, the search system 100 may determine one or more of the app states by querying one or more APIs (e.g., any of the API(s) 120-1 . . . 120-N) associated with the corresponding one or more native apps (e.g., using associated user login credentials). For instance, the search system 100 may determine the APIs associated with the native apps and, e.g., corresponding user login credentials, using data indicating APIs associated with native apps for which the user has obtained user accounts (e.g., user login credentials) and/or for which no user account is required. The search system 100 may receive this data from the user device 102 and/or another location.

In any case, upon receiving the query wrapper from the user device 102, the search system 100 (e.g., in conjunction with the content determination system 108) may generate one or more search results 138 based on the search query 134 and based on the content information 136. As described herein, to generate the search results 138, the search system 100 may identify one or more app state records included in the search data store 112 based on the search query 134, and then filter or rank the identified records using the content information 136. As also described herein, the search system 100 may further generate results scores for the identified app state records (e.g., as part of ranking the records using the content information 136). The search system 100 may then transmit the search results 138 to the user device 102. As shown in FIG. 2, the search results 138 may include one or more AAMs selected from the filtered or ranked app state records, as well as one or more result scores, link data, and/or other information (e.g., accessibility data) associated with the AAMs (e.g., the records).

In the example of FIG. 2, upon receiving the search results 138 from the search system 100, the user device 102 may display the results 138 to the user as one or more user selectable links. For example, the user device 102 may generate the user selectable links such that each link is associated with (e.g., includes) one or more of the AAMs included in the search results 138. As described herein, each AAM included in the search results 138 may specify an app state of a native app. As a result, when the user selects (e.g., touches, or clicks on) each user selectable link, the user device 102 may launch the corresponding native app and set the app into an app state specified by the AAM. In these examples, the user device 102 may generate the user selectable links using the link data also included in the search results 138. For example, the link data may include any of text (e.g., describing a name of a native app and/or an app state) and image data (e.g., an icon for the app, or app state). In this manner, the link data included in (e.g., used to generate) each user selectable link may describe the native app and/or app state associated with the link. The user device 102 may also generate one or more of the user selectable links to include the accessibility data also received as part of the search results 138. As described herein, the accessibility data included in each user selectable link may indicate to the user whether the app state specified by the link (e.g., by the corresponding one of the search results 138) is accessible to the user in the corresponding native app (e.g., as indicated by the content information 136). The user device 102 may further arrange (e.g., order, or rank) the user selectable links as part of displaying the links to the user based on the result scores also included in the search results 138. For example, the user device 102 may assign each user selectable link the result score associated with the app state record from which the AAM included in the link was selected. The user device 102 may then order the user selectable links based on the result scores (e.g., display higher-ranking links relatively higher within a list of user selectable links than lower-ranking links) Example search results 138 displayed on a user device 102 as user selectable links are described below with reference to FIGS. 7A-8C.

Figure 3A:
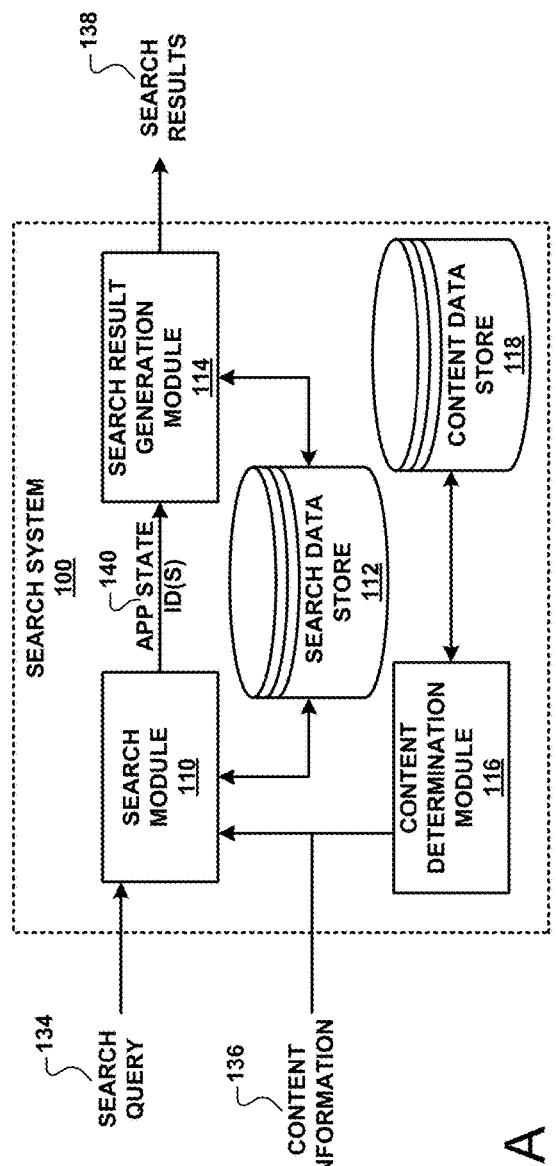
FIG. 3A is a functional block diagram of an example search system.

FIG. 3A illustrates an example of the search system 100 and the content determination system 108. As described herein, the search system 100 generates search results 138 using a search query 134 received from one of the user device(s) 102, data (e.g., app state records) included in the search data store 112, and, in some examples, content information 136 determined by the search system 100. Specifically, the search module 110 identifies one or more app state records included in the search data store 112 based on the search query 134 and, e.g., based on the content information 136. The search module 110 further ranks the identified app state records, e.g., also based on the content information 136. In some examples, the search module 110 identifies and/or ranks the app state records based on the content information 136 using the content determination system 108, as described below. The search module 110 then transmits one or more app state IDs 140 that identify the app state records to the search result generation module 114. The search result generation module 114 receives the app state IDs 140 from the search module 110, identifies the app state records in the search data store 112 using the IDs 140, and selects one or more AAMs from the records. The search result generation module 114 then transmits the AAMs to the user device 102 as the search results 138 (e.g., along with result scores, link data, and/or accessibility data).

As shown in FIG. 3A, in examples where the search system 100 generates the search results 138 based on the content information 136, the search module 110 may receive the information 136 from the user device 102 and identify or rank the app state records in the manner described herein using the information 136. In some examples, however, the content determination module 116 and/or content data store 118 performs some or all of the functions associated with the search system 100 determining the content information 136 and identifying or ranking the app state records using the information 136. For example, as also shown, the content determination module 116 may determine the content information 136 (e.g., by accessing a data store and/or querying APIs, for example using user login credentials, as described herein) and transmit the information 136 to the search module 110. In some examples, the content determination module 116 determines the content information 136 using data included in the content data store 118 and/or store the information 136 in the data store 118. In any case, the search module 110 may receive the content information 136 from the content determination module 116 and identify or rank the app state records using the information 136.

In some examples, the search module 110 identifies the app state records using the content information 136 by determining that each record includes ASI that describes one of the native app states indicated by the information 136. In other examples, the search module 110 may identify the app state records by determining that each record includes an app state ID and/or an AAM that describes (e.g., references by name) one of the native app states. In the examples described above, the search module 110 may identify the app state records based on one or more (e.g., text) matches between the content information 136 and information (e.g., one or more app state IDs, ASI, and/or AAMs) included in the identified records.

Figure 3B:
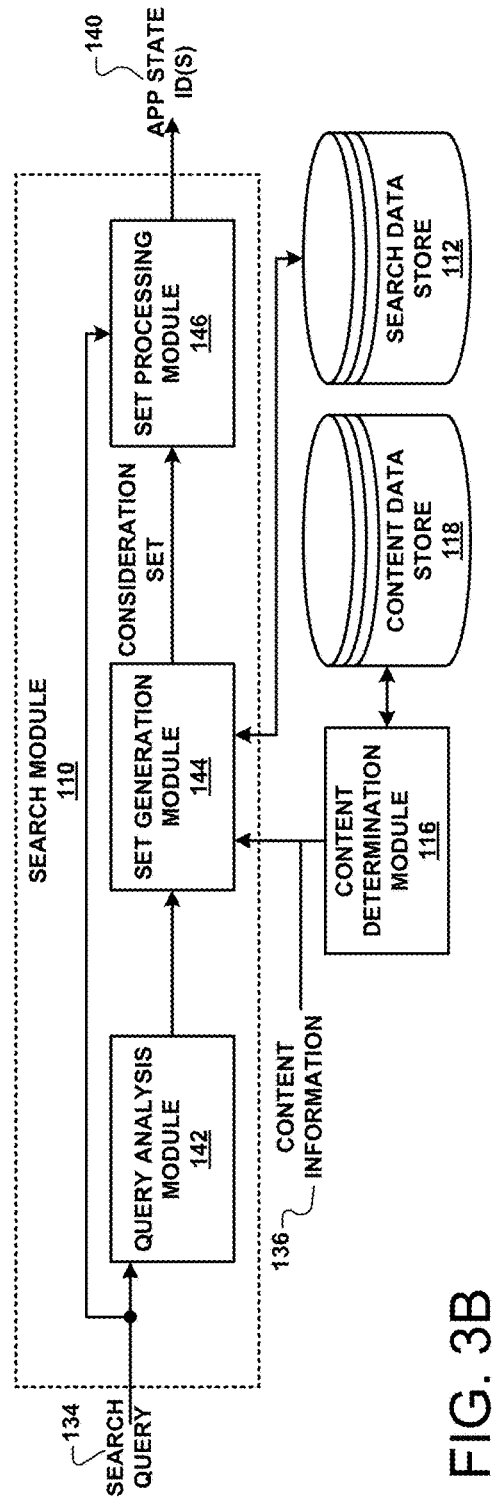
FIG. 3B is a functional block diagram of an example search module.

FIG. 3B illustrates an example of the search module 110, the search data store 112, the content determination module 116, and the content data store 118. The search module 110 of FIG. 3B includes a query analysis module 142, a consideration set generation module (hereinafter, "set generation module") 144, and a consideration set processing module (hereinafter, "set processing module") 146. The query analysis module 142 receives a search query 134 from one of the user device(s) 102 (e.g., as part of a query wrapper) and analyzes the query 134 (e.g., performs any of tokenization, filtering, stemming, synonymization, and stop word removal with respect to the query 134). The set generation module 144 identifies one or more app state records included in the search data store 112 based on the (e.g., analyzed) search query 134 and, e.g., based on content information 136, as described herein. As shown in FIG. 3B, the set generation module 144 may receive the content information 136 from the user device 102 or from the content determination system 108. As an example, the set generation module 144 may identify the app state records using the search query 134 and, e.g., the content information 136, as inputs to Lucene® information retrieval software developed by the Apache Software Foundation. For example, the set generation module 144 may identify the app state records based on one or more (e.g., text) matches between one or more terms of the search query 134 and one or more terms of information (e.g., app state IDs and/or ASI) included in the records. In some examples, the set generation module 144 further identifies the app state records based on one or more matches between the content information 136 (e.g., an indication of one or more native app states that are accessible by a user) and information (e.g., app state IDs, ASI, and/or AAMs) indicated in, or associated with, the records, as also described herein. The identified app state records may be referred to herein as a "consideration set." The set processing module 146 may process (e.g., score and select a subset of) the consideration set (e.g., generate result scores for the identified app state records based on the content information 136 and select a subset of the records based on the scores). The set processing module 146 may then generate one or more app state IDs that identify some or all of the (e.g., scored) app state records, and transmit the IDs to the search result generation module 114, as described above.

The information conveyed by the search results 138 may depend on the manner in which the set processing module 146 generates the result scores for the app state records. For example, for each app state record, the corresponding result score may indicate relevance of the app state or function specified by the record to the search query 134, popularity of the app state or function, or other properties of the app state or function, depending on the one or more parameters the set processing module 146 uses to score the app state records. The set processing module 146 may generate the result scores for the app state records in a variety of different ways. In some examples, the set processing module 146 generates a result score for an app state record based on one or more scoring features. The scoring features may be associated with the app state record and/or the search query 134. An app state record scoring feature (hereinafter, "record scoring feature") may be based on any data associated with an app state record. For example, a record scoring feature may be based on any data included in ASI of an app state record. Example record scoring features may be a quality score and whether the app state record includes an AAM that specifies a default app state (e.g., a main page of a native app) or a deeper app state. A query scoring feature may include any data associated with the search query 134. For example, a query scoring feature may include a number of words in the search query 134, popularity of the query 134, and an expected frequency of the words in the query 134. A record-query scoring feature may include any data generated based on data associated with both an app state record and the search query 134 that resulted in identification of the record by the set generation module 144. For example, record-query scoring features may include parameters that indicate how well terms of the search query 134 match terms of ASI of the identified app state record. In some examples, as described herein, the set processing module 146 generates a result score for an app state record based on the content information 136. In these examples, a content scoring feature may include any data associated with the content information 136 (e.g., an indication of one or more native app states that are accessible by a user). For instance, the set processing module 146 may generate a result score for an app state record based on whether the record specifies any of the native app states indicated by the content information 136 (e.g., based on whether the app state specified by the record is accessible by the user within the corresponding native app). According to the disclosed techniques, the set processing module 146 may generate a result score for an app state record based on at least one of the record, query, record-query, content, and/or additional scoring features not explicitly listed.

In some examples, the set processing module 146 includes one or more machine-learned models (e.g., a supervised learning model) configured to receive one or more scoring features. The machine-learned models may generate one or more result scores based on at least one of the record, query, record-query, and content scoring features described above. For example, the set processing module 146 may pair the search query 134 with each app state record and calculate a vector of features for each (query, record) pair. The vector of features may include one or more record, query, record-query, and content scoring features. The set processing module 146 may then input the vector of features into a machine-learned regression model to calculate a result score for the app state record. In some examples, the machine-learned regression model includes a set of decision trees (e.g., gradient-boosted decision trees). In other examples, the machine-learned model may be trained by a simple form of logistic regression. In still other examples, the machine-learned task described above can be framed as a semi-supervised learning task, where a minority of the training data is labeled with human curated result scores and the rest of the data is used without such labels.

As described herein, the result scores associated with the app state records (e.g., the AAMs included therein) may be used in a variety of different ways. In some examples, the result scores are used to rank (e.g., order) the AAMs within a list. In these examples, a higher result score may indicate that the corresponding AAM (e.g., app state) is more relevant to the user than an AAM having a smaller result score. In examples where the search results 138 are displayed as a list of user selectable links on the user device 102, the links including AAMs associated with larger result scores may be listed closer to the top of the list (e.g., near to the top of the screen). In these examples, links including AAMs having lower result scores may be located farther down the list (e.g., off screen) and may be accessed by scrolling down the screen of the user device 102. In some examples, as shown in FIGS. 7B and 8B described below, the user device 102 groups user selectable links associated with the same native app.

Figure 4:
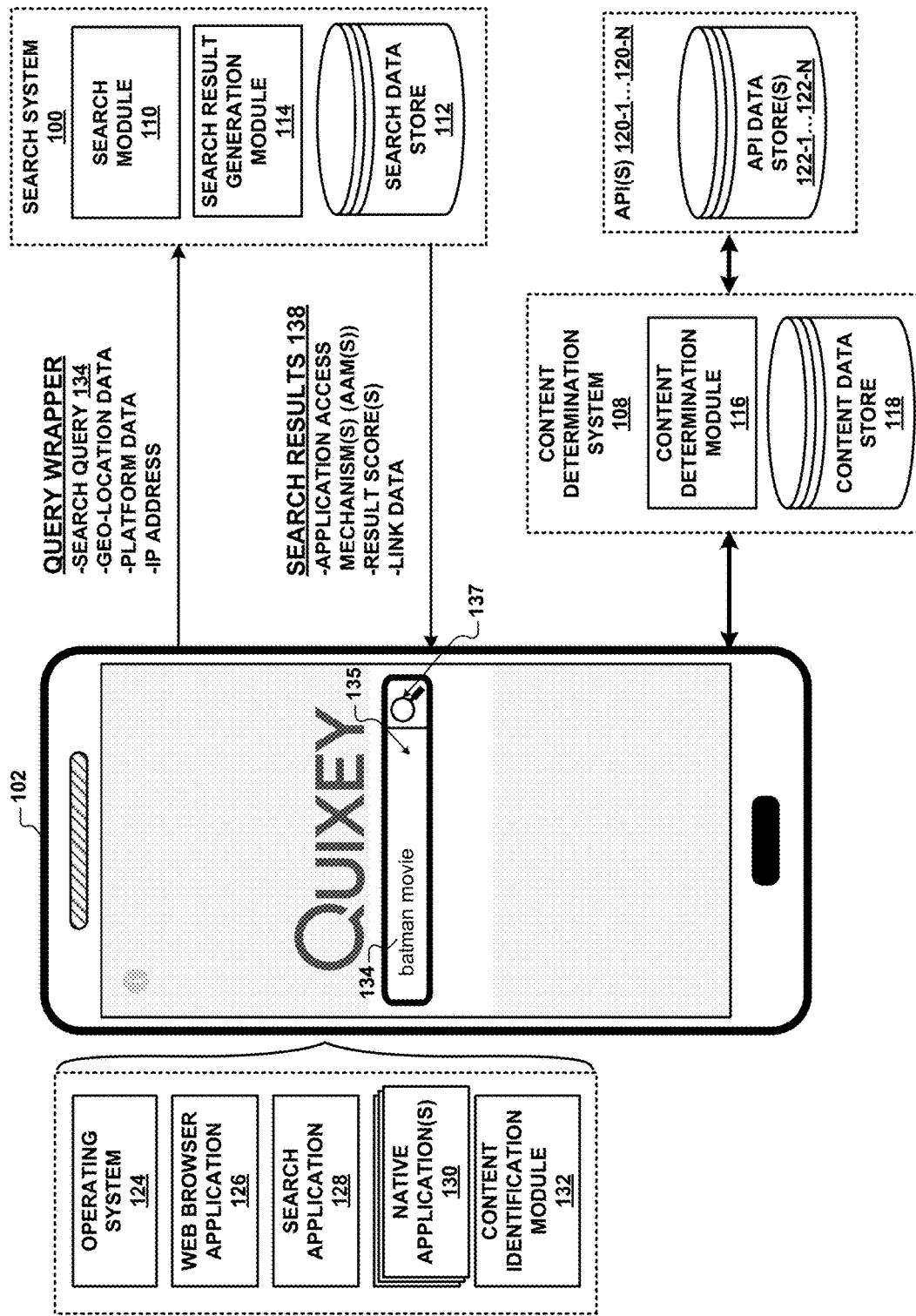
FIG. 4 illustrates another example of a user device in communication with a search system and a content determination system.

FIG. 4 illustrates another example of one of the user device(s) 102 in communication with the search system 100 and the content determination system 108. The example of FIG. 4 includes some of the features described above with reference to FIG. 2. In the example of FIG. 4, the user device 102 may transmit a query wrapper including a search query 134 and additional information (e.g., geo-location, platform, and/or IP address data) to the search system 100, in a similar manner as described above. Upon receiving the query wrapper from the user device 102, the search system 100 may generate one or more search results 138 based on the search query 134. As described herein, the search system 100 may identify one or more app state records included in the search data store 112 based on the search query 134. As also described herein, the search system 100 may further generate results scores for (e.g., rank) the identified app state records. The search system 100 may then transmit the search results 138 to the user device 102. As shown in FIG. 4, the search results 138 may include one or more AAMs selected from the identified (e.g., ranked) app state records, one or more result scores, link data, and/or other data.

In this example, the user device 102 may determine (e.g., generate) content information 136 indicating one or more app states of one or more native apps that are accessible by a user of the device 102, in a similar manner as described above with reference to FIG. 2. Upon receiving the search results 138 from the search system 100, the user device 102 may display the results 138 to the user based on the content information 136. For example, the user device 102 may generate one or more user selectable links that include the AAMs, link data, and, e.g., accessibility data, included in the search results 138. The user device 102 may further filter or rank the search results 138 (e.g., the user selectable links) using the content information 136, as described herein. The user device 102 may also arrange (e.g., further rank) the (e.g., filtered, or ranked) user selectable links as part of displaying the links to the user based on the result scores also included in the search results 138. For example, the user device 102 may display higher-ranking links relatively higher within a list than lower-ranking links.

FIGS. 5A and 5B illustrate example app state records that may be included in the search data store 112. FIG. 5A illustrates a general example of an app state record 148. The app state record 148 of FIG. 5A includes information related to (e.g., specifying) an app state of a native app. As shown in FIG. 5A, the app state record 148 includes an app state ID 150 that uniquely identifies the record 148 among other app state records included in the search data store 112. As also shown, the app state record 148 includes ASI 152 (e.g., text) that describes the app state specified by the record 148, and which may be used to identify the record 148 within the search data store 112. As further shown, the app state record 148 includes one or more AAMs 154 that enable a user device 102 to access the app state specified by the record 148 within the native app. For example, each of the AAM(s) 154 may reference the native app and indicate one or more operations for the app (e.g., the user device 102) to perform, as described herein. The native app performing the operations may set the app into the app state, as also described herein. In some examples (not shown), the app state record 148 further includes an indication that the app state specified by the record 148 is accessible to all users by virtue of launching the native app (e.g., without the users first creating a user account for the app), as further described herein.

In other examples (also not shown), the app state record 148 may further include one or more of an application download address (ADA) and a web access mechanism (WAM). The ADA and/or WAM may be selected along with the AAM(s) 154 from the app state record 148 and transmitted to a user device 102 as part of search results 138, as described herein. The ADA may specify a location (e.g., a digital distribution platform, such as the Play Store® by Google Inc.) where a user device 102 may download the native app referenced by the AAM(s) 154. In response to a user selecting a user selectable link that includes the ADA on a user device 102, the user device 102 may download the native app using the ADA and install the app. The user device 102 may further launch the native app and set the app into the app state specified by the AAM(s) 154 also included in the user selectable link. The WAM, in turn, may specify an app state of a web-based app that is equivalent (e.g., analogous) to the app state specified by the AAM(s) 154. In response to a user selecting a user selectable link that includes the WAM on a user device 102, the user device 102 may launch a web browser app 126 included on the user device 102 and access the equivalent app state of the web-based app using the WAM. For example, the WAM may include a resource identifier that references a web resource (e.g., a page of the web-based app, or website). For instance, the WAM may include a uniform resource locator (URL) (i.e., a web address) used with the hypertext transfer protocol (HTTP). Upon the user selecting the user selectable link including the WAM, the user device 102 may launch the web browser app 126 and retrieve the web resource referenced by the resource identifier (e.g., access the app state, or page, of the web-based app, or website, specified by the WAM).

In additional examples, the app state record 148 of FIG. 5A may also include information that describes values of one or more metrics associated with a person, place, or thing described in the record 148. Example metrics include the popularity of a place described in the app state record 148 and/or ratings (e.g., user ratings) of the place. For example, if the app state record 148 describes a song, a metric associated with the song may be based on the popularity of the song and/or ratings (e.g., user ratings) of the song. The information included in the app state record 148 may also be based on measurements associated with the record 148, such as how often the record 148 is retrieved during a search and how often user selectable links for any of the AAM(s) 154 of the record 148 are selected by a user. The information may also indicate whether the app state record 148 includes an AAM (e.g., one of the AAM(s) 154) for a default app state, or a deeper app state, of the native app. In some examples, the search system 100 (e.g., the set processing module 146) uses this information to generate a result score for the app state record 148 (e.g., upon identifying the record 148 based on a search query 134 and as part of ranking the record 148 among other identified app state records), as described herein.

FIG. 5B illustrates a specific example of an app state record 158 that specifies an app state of the native app "Netflix®" by Netflix, Inc. (hereinafter, "Netflix"). The app state specified by the app state record 158 of FIG. 5B corresponds to an entry in Netflix for the movie "Batman Returns." As shown in FIG. 5B, the app state record 158 includes an app state ID "Netflix—Batman Returns" 160 that uniquely identifies the record 158 among other app state records included in the search data store 112. In other examples, the app state ID 160 may be a numeric value or have another (e.g., machine-readable) representation. As further shown, the app state record 158 includes ASI 162 that describes the app state specified by the record 158. As shown, the ASI 162 includes a description of the movie "Batman Returns," cast and production information, user reviews/ratings, and/or any other information (e.g., additional data fields) related to the movie or to the app state specified by the app state record 158. In some examples, the ASI 162 also describes one or more functions provided by the app state, such as, e.g., "check show times," "buy tickets," "read user reviews," and "write a user review." As also shown, the app state record 158 further includes one or more AAMs 164 that enable a user device 102 to access the app state specified by the record 158 in Netflix. The app state record 158 may also optionally include one or more ADAs and/or WAMs, as described above.

Figure 6B:
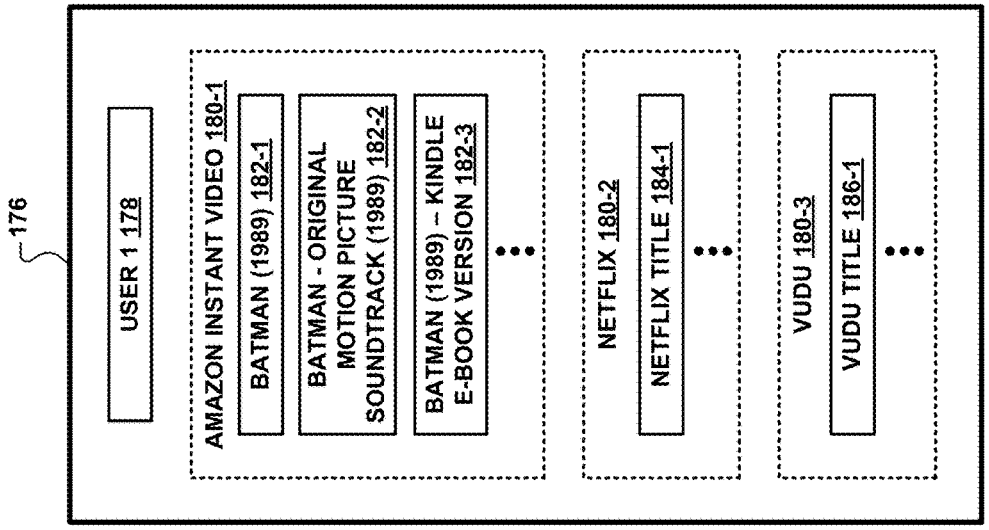
FIGS. 6A and 6B illustrate example data structures for storing content information.
Figure 6A:
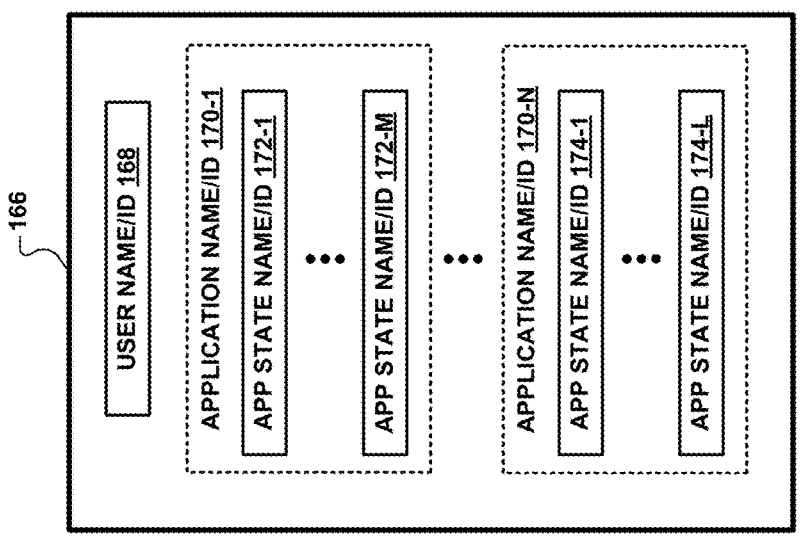

FIGS. 6A and 6B illustrate example data structures that may be used to store content information 136 according to the present disclosure. FIG. 6A illustrates a general example of such a data structure 166. The data structure 166 of FIG. 6A includes information indicating one or more native app states that are accessible by a user (e.g., of a user device 102). For example, the data structure 166 may represent this information using any combination of alphabetic, numeric, and other (e.g., machine-readable) representations. As show in FIG. 6A, the data structure 166 includes a user name/ID 168 that uniquely identifies the structure 166 and the corresponding user among other similar data structures and associated users (e.g., all of which may be stored in a common data store). As also shown, the data structure 166 further includes one or more app names/IDs 170-1 . . . 170-N (collectively, "app name(s)/ID(s) 170") (where "N" is a positive integer value greater or equal to 1) that each specify a native app that includes one or more app states that are accessible by the user. As further shown, the data structure 166 also includes, for each of the app name(s)/ID(s) 170, one or more of app state names/IDs 172-1 . . . 172-M and 174-1 . . . 174-L (collectively, "app state name(s)/ID(s) 172, 174) (where "M" and "L" are each a positive integer value greater or equal to 1) that each specify one of the app states. As such, the data structure 166 represents a content registry indicating one or more app states of one or more native apps that are each accessible by the user. As explained herein, the user may have access to the app states by virtue of the user creating a user account for any of the native apps, purchasing or otherwise acquiring access to any of the states, and/or accessing any of the states without first creating a user account. The data structure 166 and various contents thereof (e.g., the app name(s)/ID(s) 170 and/or app state name(s)/ID(s) 172, 174) may be generated and/or updated by detecting the user obtaining access to one or more of the app states in one or more of the native apps, accessing one or more of the apps on a user device 102, accessing another location in or outside of the device 102, and/or querying one or more APIs associated with one or more of the apps, as described herein.

FIG. 6B illustrates a specific example of the data structure 166 described above. The data structure 176 of FIG. 6B includes a user name/ID "User 1" 178 that uniquely identifies the structure 176 and the corresponding user among any other analogous data structures and associated users. The data structure 176 further includes app names/IDs "Amazon Instant Video" 180-1, "Netflix" 180-2, and "Vudu" 180-3 that each specify a native app (i.e., one of "Amazon Instant Video," "Netflix," and "Vudu") that includes one or more app states that are accessible to the user. The data structure 176 also includes, for each of the app names/IDs 180-1, 180-2, and 180-3, the corresponding ones of app state names/IDs 182-1, 182-2, 182-3, 184-1, and 186-1 that each specify one of the app states. As shown in FIG. 6B, the app name/ID 180-1 specifying "Amazon Instant Video" is associated with app state names/IDs 182-1, 182-2, and 182-3 specifying app states of "Amazon Instant Video" corresponding to the movie "Batman," a soundtrack for the movie, and an electronic book (e-book) associated with the movie. As further shown, the app name/ID 180-2 specifying "Netflix" is associated with one or more app state names/IDs 184 specifying one or more (e.g., hundreds of) app states of "Netflix" corresponding to various titles (e.g., movies and television show episodes). Similarly, as also shown, the app name/ID 180-3 specifying "Vudu" is associated with one or more app state names/IDs 186 specifying one or more app states of "Vudu" corresponding to various video titles.

FIGS. 7A-8C illustrate example GUIs that may be generated on a user device 102 according to the present disclosure. Specifically, the examples of FIGS. 7A-8C depict a user device 102 performing a search for app states of native apps based on a search query 134 specified by a user of the user device 102 and content information 136 associated with the user. As shown in FIG. 7A, the user enters a search query "batman movie" 134 into (e.g., a search field 135 of) a GUI of a search app 128 executing on the user device 102. As also shown, the user further interacts with (e.g., a search button 137 of) the GUI to cause the search app 128 to transmit the search query 134 to a search system 100. In some examples, the user device 102 (e.g., the search app 128) also transmits content information 136 indicating native app states that are accessible by the user to the search system 100 (e.g., along with the search query 134). In other examples, the search system 100 may determine the content information 136. In the above-described examples, the content information 136 may indicate an app state corresponding to an entry in the native app "Amazon Instant Video®" by Amazon, Inc. (hereinafter, "Amazon Instant Video" for the movie "Batman." In this example, the user may have initially created a user account with corresponding user login credentials for Amazon Instant Video for a fee. The user may have then purchased access to the app state (e.g., paid to have the movie "Batman" added to the user's Amazon Instant Video library for unlimited playback). The content information 136 may further indicate an app state corresponding to an entry in Netflix for the movie "Batman Returns." In this example, the user may have created a user account with corresponding user login credentials for Netflix for a fee. As a result, the user may have obtained access to (e.g., unlimited playback for) all app states in Netflix, including the app state, by virtue of creating the user account. The content information 136 may also indicate an app state corresponding to an entry in the native app "Hulu®" by Hulu, Inc. (hereinafter, "Hulu") for the movie "The Dark Knight." In this example, the user may have obtained access to all app states in Hulu, including the app state, without first creating a user account for Hulu.

As shown in FIG. 7B, the user device 102 receives search results 138 from the search system 100 in response to transmitting the search query 134 and, e.g., the content information 136, to the search system 100 and displays the search results 138 to the user as user selectable links 190-1 . . . 190-3 (collectively, the "links 190"). In the example of FIG. 7B, the search results 138 are responsive to the search query 134 (i.e., the text string "batman movie") and specify app states of Amazon Instant Video, Netflix, and Hulu that are accessible to the user. In other words, the app state specified by each search result 138 (e.g., by an AAM included therein) is accessible by the user in one of these native apps, e.g., using the associated user account (the corresponding user login credentials). In this example, the search system 100 may have generated each search result 138 by determining that the corresponding app state record 148 specifies one of the app states of, or entries in, Amazon Instant Video, Netflix, and Hulu indicated by the content information 136. As shown in FIG. 7B, the user device 102 may arrange the links 190 using app headers 188-1 . . . 188-3 (collectively, the "headers 188") that indicate the corresponding native apps. As further shown, the user device 102 may also order the links 190 based on relevance of the corresponding ones of the search results 138 to the search query 134. Specifically, as shown in FIG. 7B, the user selectable link 190-1 (e.g., the corresponding search result 138) referencing the movie "Batman" may be more relevant to the search query "batman movie" 134 than the user selectable links 190-2 and 190-3 referencing the movies "Batman Returns" and "The Dark Knight," respectively. As also shown, the user device 102 may display the links 190 such that one or more of the links 190 each indicate to the user (e.g., via any of GUI elements 192, 194, and 196) that the corresponding app state of Amazon Instant Video, Netflix, or Hulu is accessible by the user. For example, the user device 102 may generate each such link 190 using accessibility data also received from the search system 100 as part of the search results 138.

As further shown in FIG. 7B, the user may select (e.g., touch, or click on) one of the links 190 on the user device 102, namely the link 190-1 specifying the entry in Amazon Instant Video for the movie "Batman." As shown in FIG. 7C, upon the user selecting the user selectable link 190-1, the user device 102 may launch Amazon Instant Video and set Amazon Instant Video into the app state specified by the link 190-1 (e.g., by an AAM included therein). In particular, the user device 102 may configure Amazon Instant Video to display a GUI 198 for the entry in Amazon Instant Video for the movie "Batman." Upon the user device 102 setting Amazon Instant Video into the app state (e.g., the entry), the user may interact with the state (e.g., cause Amazon Instant Video to play the movie "Batman" on the user device 102).

Figure 8A:
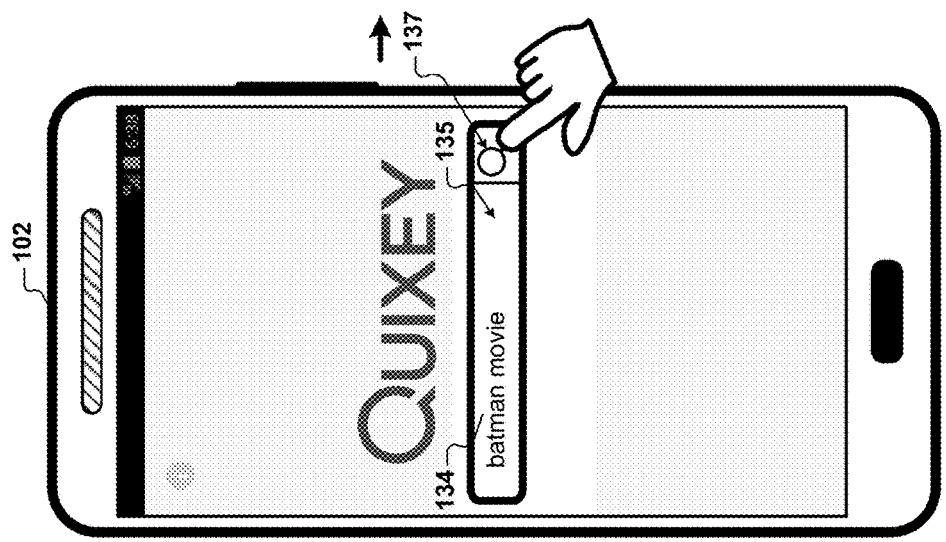

FIG. 8A is analogous to FIG. 7A described above. In the example of FIGS. 8A-8C, the content information 136 may once again indicate app states corresponding to entries in Amazon Instant Video and Netflix for the movies "Batman" and "Batman Returns." FIG. 8B shows search results 138 received by the user device 102 from the search system 100 in response to transmitting the search query 134 and, e.g., the content information 136, to the search system 100. As shown in FIG. 8B, the user device 102 displays the search results 138 to the user as user selectable links 190-1, 190-2, and 190-4 (collectively, the "links 190"). In this example, the search results 138 are responsive to the search query 134 and specify app states of Amazon Instant Video and Netflix that are accessible by the user, in a similar manner as described above with reference to FIG. 7B. As also shown, the search results 138 further specify an app state corresponding to an entry in the native app "Hulu Plus®" by Hulu, Inc. (hereinafter, "Hulu Plus") for the movie "Batman." In this example, the user may not have access to the app state corresponding to the entry in Hulu Plus for the movie "Batman." For example, the user may not have created a user account (e.g., with corresponding user login credentials) required by Hulu Plus to access app states of Hulu Plus. Additionally, or alternatively, the user may not have obtained (e.g., purchased, or otherwise acquired)

access to the app state (e.g., paid to have the movie "Batman" added to the user's Hulu Plus library for unlimited playback).

In the example of FIGS. 8A-8C, each search result 138 may be associated with a result score generated by the search system 100 based on whether the corresponding app state record 148 specifies any of the app states of, or entries in, Amazon Instant Video and Netflix indicated by the content information 136. As shown in FIG. 8B, the user device 102 may display the links 190 generated for the search results 138 by ranking (e.g., ordering) each link 190 based on the corresponding result score. For example, as shown, the user device 102 may display the user selectable link 190-1 specifying the entry for the movie "Batman" in Amazon Instant Video, which is accessible by the user, higher within a list than the user selectable link 190-4, which specifies the entry for the same movie in Hulu Plus that is not accessible by the user. As also shown, the user device 102 may display the links 190 such that one or more of the links 190 each indicate to the user (e.g., via any of GUI elements 192 and 194) whether the corresponding app state of Amazon Instant Video, Netflix, or Hulu Plus is accessible to the user. For example, the user device 102 may generate each such link 190 using accessibility data received from the search system 100 along with the search results 138, as described above. As further shown, in some examples, the user device 102 also arranges the links 190 using app headers 188-1, 188-2, and 188-4 and/or order the links 190 based on relevance of the corresponding ones of the search results 138 to the search query 134, in a similar manner as described above.

As shown in FIG. 8B, the user may select the user selectable link 190-2 specifying the entry in Netflix for the movie "Batman Returns," which is accessible to the user (e.g., as part of the user's Netflix subscription, or user account). As shown in FIG. 8C, upon the user selecting the user selectable link 190-2, the user device 102 may launch Netflix and set Netflix into the app state specified by the link 190-2 (e.g., cause Netflix to display a GUI 200 for the "Batman Returns" entry). Upon the user device 102 setting Netflix into the app state, the user may interact with the state (e.g., cause Netflix to play the movie "Batman Returns").

Figure 9A:
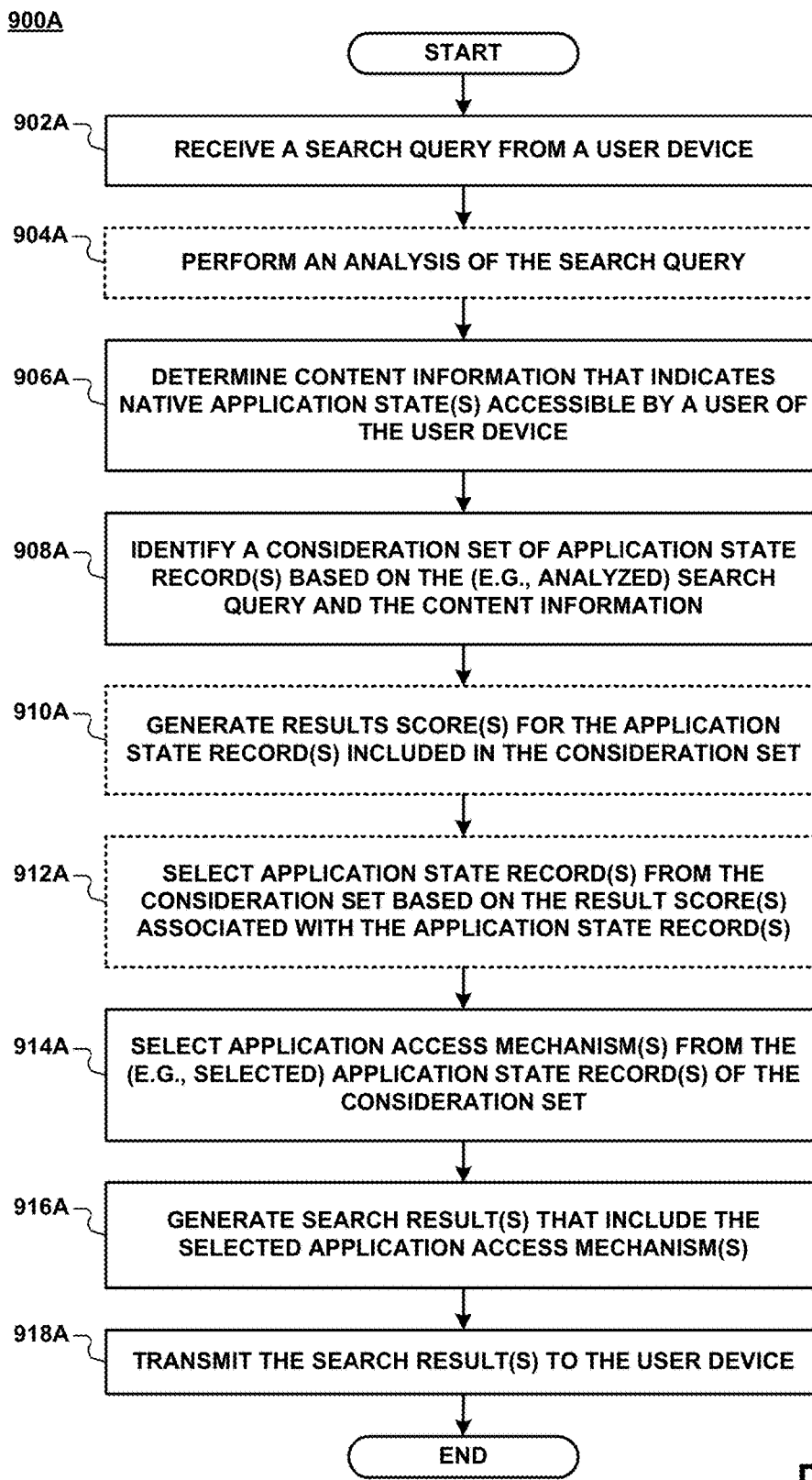
FIGS. 9A and 9B are flow diagrams illustrating example methods for generating search results based on a search query and content information at a search system.
Figure 9B:
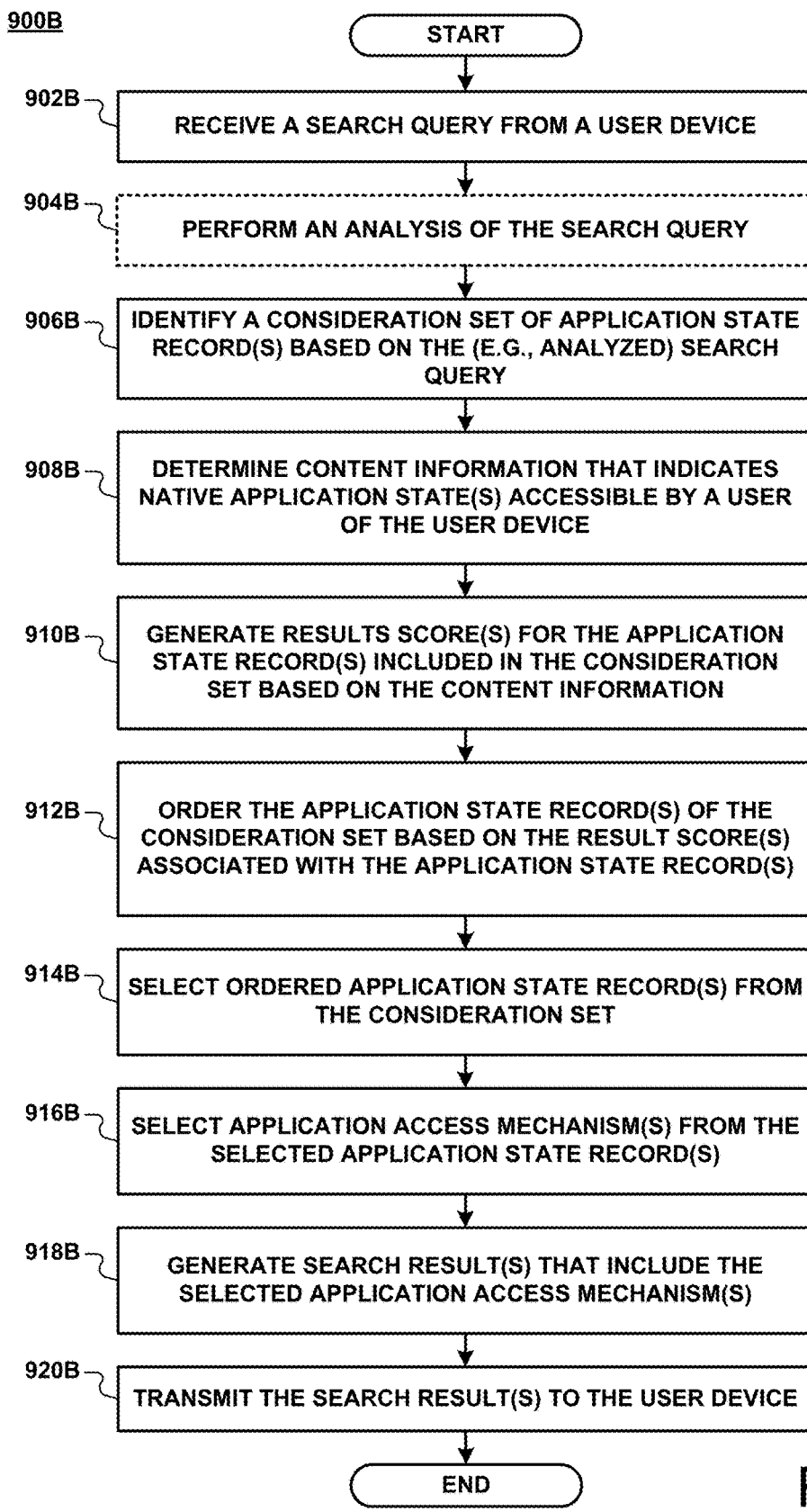

FIGS. 9A and 9B are flow diagrams that illustrate example methods for generating app state search results 138 at a search system 100 based on a search query 134 received from a user device 102 and based on content information 136 determined by the search system 100. FIG. 9A illustrates an example method 900A for generating the search results 138 by filtering one or more app state records 148 identified using the search query 134 based on the content information 136. FIG. 9B, in turn, illustrates an example method 900B for generating the search results 138 by ranking the app state record(s) 148 based on the content information 136.

With reference to FIG. 9A, in block 902A, the search system 100 may initially receive a search query 134 specified by a user from a user device 102 (e.g., as part of a query wrapper). In block 904A, the search system 100 (e.g., the query analysis module 142) may optionally perform an analysis of the search query 134. In block 906A, the search system 100 may determine content information 136 that indicates one or more native app states that are accessible by the user of the user device 102. As described herein, each native app state may correspond to an entry in a native app (e.g., any of the native app(s) 130, or a native app not installed on the user device 102) for any type of media or document. As also described herein, the native app states may be accessible to the user in the one or more native apps by virtue of the user having performed any of the following. As one example, the user may have access to each of one or more of the native app states in one or more of the native apps by virtue of using (e.g., launching) the apps (e.g., without first creating a user account for each app). As another example, the user may have created a user account for (e.g., registered with) each of one or more of the native apps (e.g., for free, or for a fee), thereby gaining access to each of one or more of the native app states in the apps. Additionally, or alternatively, the user may have obtained (e.g., for free, or for a fee) access to each of one or more of the native app states in the corresponding one of the native apps (e.g., by first creating a user account for the app, or with no user account).

In some examples, the search system 100 receives the content information 136 from the user device 102 (e.g., also as part of the query wrapper, or separately from the search query 134). For example, the user device 102 may generate the content information 136 by performing any of the following. As one example, the user device 102 (e.g., the content ID module 132) may determine one or more of the native app states indicated by the content information 136 by detecting (e.g., monitoring) the user obtaining (e.g., purchasing, or gaining free of charge) access to the states within one or more native apps (e.g., any of the native app(s) 130 and/or any other native apps previously installed on the user device 102). As another example, the user device 102 (e.g., the content ID module 132) may determine one or more of the native app states by directly accessing one or more of the native app(s) 130 (e.g., using corresponding user login credentials). In this example, upon accessing (e.g., logging into) the native app(s) 130, the user device 102 may determine that the user has obtained (e.g., purchased, or gained free of charge) or is presently granted access to the native app states within the app(s) 130. In still another example, the user device 102 (e.g., the content ID module 132) may determine one or more of the native app states by accessing another memory location on the device 102, or outside of the device 102 (e.g., a content registry). In yet another example, the user device 102 (e.g., via the content determination system 108) may determine one or more of the native app states by querying one or more APIs (e.g., any of the API(s) 120 and/or other APIs) associated with the corresponding one or more native apps (e.g., any of the native app(s) 130 and/or any other native apps that are not installed on the user device 102). In this example, as part of querying the API(s) (e.g., using corresponding user login credentials), the user device 102 may determine that the user has obtained (e.g., purchased, or gained free of charge) or is presently granted access to the native app states within the native apps. For example, the user device 102 may determine the APIs associated with the native apps and, e.g., corresponding user login credentials, using information retrieved from another location. The information may indicate APIs associated with native apps for which the user has obtained user accounts (e.g., having user login credentials), and/or for which no user account is required. In other examples, upon generating the content information 136, the user device 102 may store the information 136 in a data store where the search system 100 may retrieve the information 136.

In other examples, the search system 100 may receive the content information 136 from the content determination system 108. The content determination system 108 may generate the content information 136 by performing any of the following, in a similar manner as described above with reference to the user device 102. In one example, the content determination system 108 (e.g., the content determination module 116) may determine one or more of the native app states indicated by the content information 136 by accessing a location in the system 108 (e.g., the content data store 118), or outside of the system 108 (e.g., a content registry). In another example, the content determination system 108 (e.g., the content determination module 116) may determine one or more of the native app states by querying one or more APIs (e.g., any of the API(s) 120 and/or other APIs) associated with the corresponding one or more native apps (e.g., any of the native app(s) 130 and/or any other native apps not installed on the user device 102). In this example, the content determination system 108 may determine the APIs associated with the native apps and, e.g., corresponding user login credentials, using information retrieved from the user device 102 and/or another location. The information may indicate APIs associated with native apps for which the user has obtained user accounts (e.g., having user login credentials), and/or for which no user account is required. In response to querying the APIs (e.g., using the user login credentials), the content determination system 108 may determine that the user has obtained or is presently granted access to the native app states within the native apps. In further examples, the content determination system 108 (e.g., the content determination module 116) may store the content information 136 in the content data store 118 (e.g., for later retrieval).

In some examples, the search system 100 receives other information from the user device 102 (e.g., as part of the query wrapper, or separately), such as user information and/or geo-location, platform, and IP address information associated with the user device 102. In any case, in block 908A, the search system 100 (e.g., the set generation module 144) may identify a consideration set of one or more app state records 148 included in the search data store 112 based on the (e.g., analyzed) search query 134 and based on the content information 136. In this example, each identified app state record 148 may specify an app state of a native app. The search system 100 (e.g., the set generation module 144) may identify the app state records 148 based on matches between terms of the search query 134 and terms of information (e.g., app state IDs 150 and/or ASI 152) included in the records 148. The search system 100 (e.g., the set generation module 144) may further identify the app state records 148 based on matches between the one or more app states of native apps specified by the records 148 and the native app states indicated by the content information 136. For example, the search system 100 may identify the app state records 148 such that each record 148 both matches the search query 134, as described above, and includes any of an app state ID 150, ASI 152, and an AAM 154 that describes one of the native app states indicated by the content information 136.

In some examples, the search system 100 identifies one or more of the app state records 148 using content information 136 that has been previously determined, as described above. In other examples, the search system 100 may identify one or more of the app state records 148 using dynamically-determined content information 136 (e.g., determined on an app state record-basis and indicating only app states of the identified app state records 148, thereby enhancing user privacy). As one example, for at least one of the identified app state records 148, the search system 100 may query an API associated with the native app referenced by the AAM 154 included in the record 148. In response to querying the API, the search system 100 may determine that the app state of the native app described by the ASI 152 included in the app state record 148 is accessible by the user.

In some examples, the search system 100 initially determines user login credentials associated with the native app and with the user (e.g., determine that the app is associated with a user account having user login credentials belonging to the user) and then query the API using the user login credentials. In these examples, the search system 100 may determine the native app, user account, associated API, and, e.g., user login credentials, by retrieving information from the user device 102 and/or another location. The information may indicate APIs associated with native apps for which the user has obtained user accounts (e.g., having user login credentials). As another example, at least one of the identified app state records 148 may include an indication (e.g., text) that the app state described by the ASI 152 included in the record 148 is accessible by all users. In this example, the search system 100 may determine that the app state is accessible by the user based on the indication.

In blocks 910A-912A, the search system 100 (e.g., the set processing module 146) may optionally process the consideration set of app state records 148. Specifically, in block 910A, the search system 100 may generate one or more result scores for the app state records 148 included in the consideration set. For example, the search system 100 may generate a result score for each app state record 148 included in the consideration set. In block 912A, the search system 100 may select one or more (e.g., a subset of the) app state records 148 from the consideration set based on the one or more result scores associated with the selected records 148. For example, the search system 100 may select one or more app state records 148 having the highest (e.g., largest) one or more result scores. In any case, in block 914A, the search system 100 (e.g., the search result generation module 114) may select one or more AAMs from the (e.g., selected) app state records 148 of the consideration set. For example, the search system 100 may select one or more AAMs from each (e.g., selected) app state record 148. In some examples, the search system 100 also selects other information from the (e.g., selected) app state records 148, such as result scores, link data, and/or accessibility data associated with the records 148. In block 916A, the search system 100 (e.g., the search result generation module 114) may generate one or more search results 138 that include the selected AAMs. For example, the search system 100 may generate the search results 138 such that each result 138 includes one or more AAMs (and, e.g., other information) selected from each (e.g., selected) app state record 148 of the consideration set. In block 918A, the search system 100 (e.g., the search result generation module 114) may transmit the search results 138, including the selected AAMs and any other information, to the user device 102 that generated the search query 134.

With reference to FIG. 9B, blocks 902B-904B are analogous to blocks 902A-904A described above. In block 906B, the search system 100 (e.g., the set generation module 144) may identify a consideration set of one or more app state records 148 included in the search data store 112 based on the (e.g., analyzed) search query 134. In this example, each identified app state record 148 may specify an app state of an app, as described herein. For example, the search system 100 (e.g., the set generation module 144) may identify the app state records 148 based on matches between terms of the search query 134 and terms of information (e.g., app state IDs 150 and/or ASI 152) included in the records 148, as also described herein. In block 908B, the search system 100 may determine content information 136, in a similar manner as described above with reference to FIG. 9A. For example, the search system 100 may receive the content information 136 from the user device 102 or from the content determination system 108. The user device 102 or the content determination system 108 may generate the content information 136 using any of the techniques previously described with reference to FIG. 9A. The search system 100 may receive other data from the user device 102, e.g., user information and/or geo-location, platform, and IP address information associated with the user device 102, as also described above.

In blocks 910B-914B, the search system 100 (e.g., the set processing module 146) may process the consideration set of app state records 148. In particular, in block 910B, the search system 100 may generate a result scores for each app state record 148 included in the consideration set based on the content information 136. For example, the search system 100 may generate each result score using the content information 136 as (e.g., part of) a scoring feature in conjunction with a machine-learned regression model, as described herein. As a specific example, the search system 100 may generate each result score based on whether the app state specified by the corresponding app state record 148 is any of the native app states accessible to the user of the user device 102, as indicated by the content information 136. In some examples, the search system 100 further generates each result score based on one or more additional scoring features, e.g., record, query, and/or record-query scoring features, as described herein. In block 912B, the search system 100 (e.g., the set processing module 146) may order (e.g., rank) the app state records 148 of the consideration set based on the corresponding result scores (e.g., arrange the records 148 in the order of decreasing result scores). In block 914B, the search system 100 (e.g., the set processing module 146) may select one or more of the ordered app state records 148 from the consideration set (e.g., a subset of the ordered app state records 148 defined by a result score threshold, the subset including one or more highest-ranking records 148).

In block 916B, the search system 100 (e.g., the search result generation module 114) may select one or more AAMs from the selected app state records 148, e.g., along with other information, such as result scores, link data, and/or accessibility data associated with the records 148, as described herein. In block 918B, the search system 100 may generate one or more search results 138 that include the selected AAMs and any other information and, in block 920B, transmit the results 138, including the selected AAMs, to the user device 102 that generated the search query 134, as also described herein.

Figure 10A:
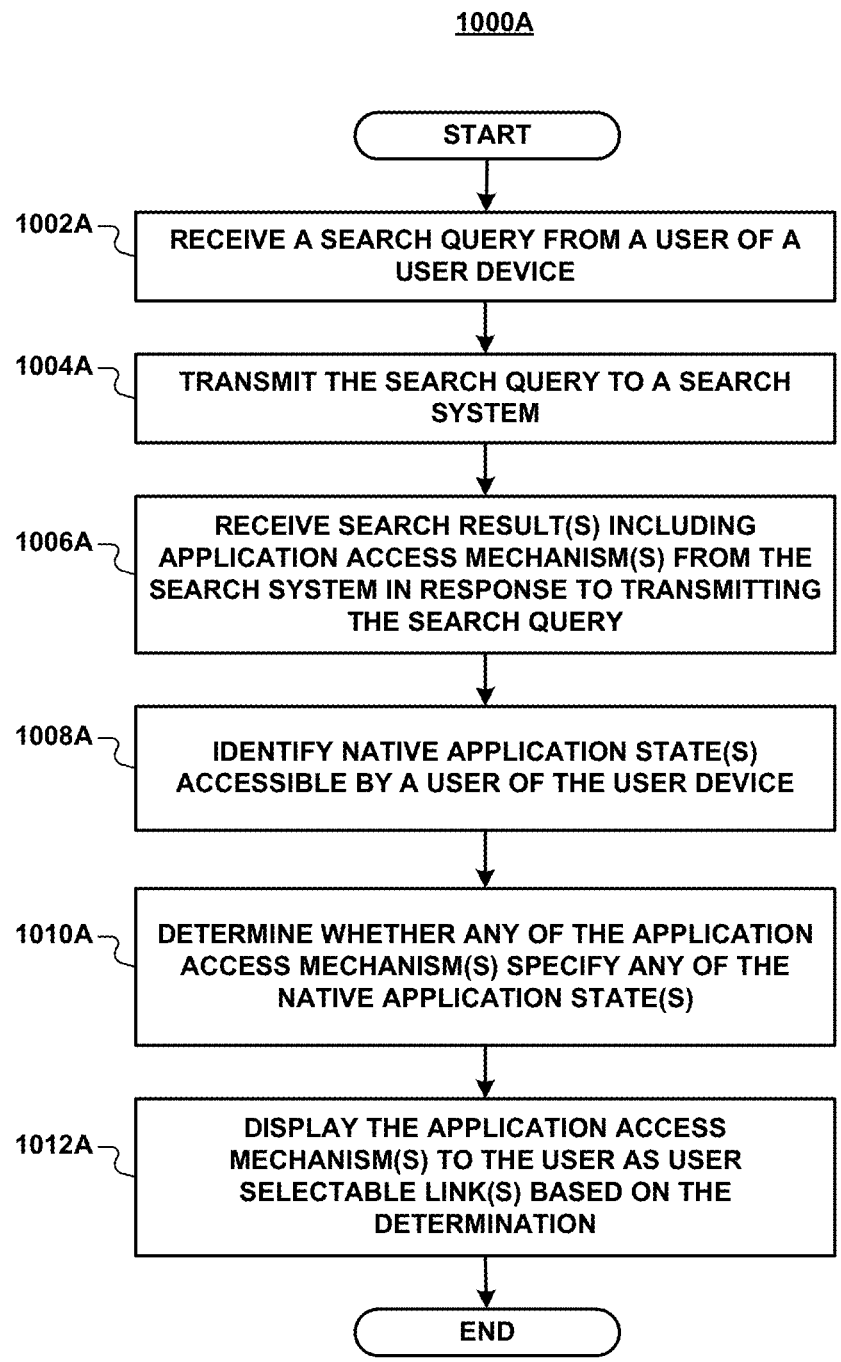
FIGS. 10A and 10B are flow diagrams illustrating example methods for generating search results based on a search query and content information at a user device.

FIG. 10A is a flow diagram that illustrates an example method 1000A for generating app state search results 138 at a user device 102 based on a search query 134 specified by a user of the user device 102 and content information 136 associated with the user. As shown in FIG. 10A, in block 1002A, the user device 102 may receive a search query 134 (e.g., a text string) from the user. For example, the user device 102 may receive the search query 134 via (e.g., a GUI of) a search app 128 executing on the user device 102. In block 1004A, the user device 102 may transmit the search query 134 to the search system 100 (e.g., as part of a query wrapper). The search system 100 may receive the search query 134 from the user device 102 and generate one or more search results 138 based on the search query 134. As described herein, the search results 138 may include one or more AAMs, result scores, link data, and/or accessibility data. The search system 100 may then transmit the search results 138 to the user device 102. In block 1006A, the user device 102 may receive the search results 138, including the AAMs, from the search system 100 in response to transmitting the search query 134 to the search system 100.

In block 1008A, the user device 102 may identify one or more native app states that are accessible to the user (e.g., content information 136), in a similar manner as described above with reference to FIGS. 9A and 9B. As described herein, the user device 102 (e.g., the search app 128) may identify the native app states using the content ID module 132 (e.g., by detecting the user obtaining access to the states within one or more native apps, accessing one or more of the native app(s) 130, accessing another location within or outside of the device 102, or querying one or more APIs associated with the corresponding one or more native apps).

In block 1010A, the user device 102 may determine whether any of the AAMs included in the search results 138 specify any of the native app states. For example, an AAM included in the search results 138 specifying one of the native app states may indicate that the user may access the app state specified by the AAM (i.e., the one of the native app states) within the corresponding native app. In a specific example, the user device 102 may, for each of the AAMs, determine whether the native app referenced by the AAM performing the one or more operations indicated by the AAM sets the app into any of the native app states.

In block 1012A, the user device 102 may display the AAMs included in the search results 138 to the user as one or more user selectable links based on the above-described determination. For example, each user selectable link may include one or more of the AAMs and, e.g., the corresponding link and/or accessibility data also received as part of the search results 138. As one example, the user device 102 may filter the search results 138 based on the determination by displaying only those of the AAMs that specify any of the native app states as user selectable links. In other words, the user device 102 may select only those of the AAMs that specify app states that are accessible by the user. As another example, the user device 102 may rank the search results 138 based on the determination by generating a result score for each AAM based on whether the AAM specifies any of the native app states (e.g., based on whether the app state specified by the AAM is accessible to the user). In some examples, the user device 102 further generates the result score for the AAM based on the corresponding result score received as part of the search results 138. In any case, the user device 102 may further rank (e.g., order) user selectable links including the AAMs based on the corresponding result scores.

Figure 10B:
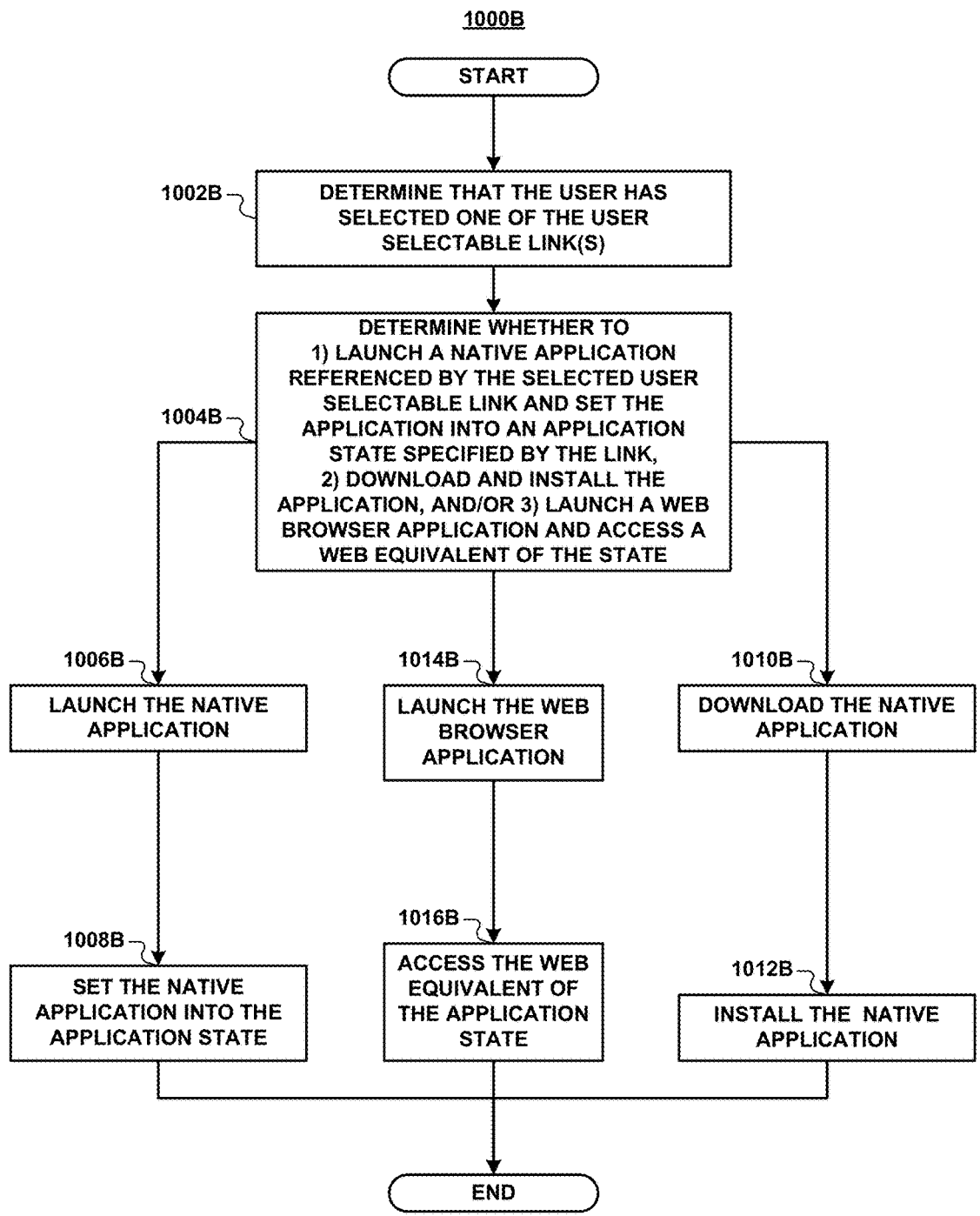

FIG. 10B is a flow diagram that illustrates an example method 1000B for performing one or more example actions in response to a user of a user device 102 interacting with app state search results 138 displayed to the user on the user device 102. As shown in FIG. 10B, in block 1002B, the user device 102 may initially determine (e.g., detect) that the user has selected one of the user selectable links displayed to the user as described above with reference to FIG. 10A. As also shown, in block 1004B, in response to detecting the user selection, the user device 102 may determine whether to perform any of the following actions. As one example, as shown in blocks 1006B and 1008B, the user device 102 may launch a native app referenced by the selected user selectable link (e.g., by an AAM included in the link) and set the app into an app state specified by the link (e.g., by the AAM). As another example, as shown in blocks 1010B and 1012B, the user device 102 may download the native app (e.g., from a digital distribution platform using an ADA also included in the selected user selectable link) and install the app. In this example, upon downloading and installing the native app, the user device 102 may launch the app and set the app into the app state, in a similar manner as described above with reference to blocks 1006B and 1008B. As still another example, as shown in blocks 1014B and 1016B, the user device 102 may launch a web browser app 126 and access a URL corresponding to an app state of a web-based app (e.g., using a WAM also included in the selected user selectable link). The app state of the web-based app may be an equivalent of the app state of the native app described above.

The user device 102 may determine whether to perform any combination of the above-described actions. As one example, in the event the native app referenced by the selected user selectable link is installed on the user device 102, the user device 102 may launch the app and set the app into the app state. As another example, in the event the native app is not installed on the user device 102, the user device 102 may download and install the app (e.g., followed by launching the app and setting the app into the app state). As still another example, in the event the user device 102 lacks sufficient storage space and/or communications network bandwidth to download and/or install the native app as described above, the user device 102 may launch the web browser app 126 and access the URL corresponding to the web equivalent of the app state.

In additional examples, the search system 100 may generate one or more additional search results (not shown) that include content that is not associated with app states of native apps (e.g., content related to native apps, web sites, documents, and/or media files). In these examples, the search system 100 may identify one or more records (e.g., app records, or other data structures) stored in a data store that include the content based on the search query 134, in a similar manner as described above. The search system 100 may select the content from the identified records and transmit the content to the user device 102 with the search results 138.

The modules and data stores included in the search system 100 and content determination system 108 represent features that may be included in these systems 100, 108 as they are described in the present disclosure. For example, the search module 110, search result generation module 114, and search data store 112 may represent features included in the search system 100. Similarly, the content determination module 116 and content data store 118 may represent features included in the content determination system 108. The modules and data stores described herein may be embodied by electronic hardware, software, firmware, or any combination thereof. Depiction of different features as separate modules and data stores does not necessarily imply whether the modules and data stores are embodied by common or separate electronic hardware, software, or firmware components. In some implementations, the features associated with the modules and data stores depicted herein are realized by common or separate electronic hardware, software, and/or firmware components.

The modules and data stores may be embodied by electronic hardware, software, and/or firmware components, including one or more processing units, one or more memory components, one or more input/output (I/O) components, and interconnect components. The interconnect components may be configured to provide communication between the processing units, memory components, and I/O components. For example, the interconnect components may include one or more buses configured to transfer data between electronic components. The interconnect components may also include control circuits (e.g., a memory controller and/or an I/O controller) configured to control communication between electronic components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component, or memory, may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDDs), solid state drives (SSDs), magnetic tape drives, optical storage technology (e.g., compact disc, digital versatile disc, and/or Blu-ray disc), or any other memory components.

The memory components may include (e.g., store) the data described herein. For example, the memory components may include the data included in the app state record(s) 148 of the search data store 112 and/or the data included in any of the content data store 118 and API data store(s) 122. The memory components may also include instructions that may be executed by the processing units. For example, the memory components may include computer-readable instructions that, when executed by the processing units, cause the processing units to perform the various functions attributed to the modules and data stores described herein.

The I/O components may refer to electronic hardware, software, and/or firmware providing communication with a variety of different devices. For example, the I/O components may provide communication between other devices and the processing units and memory components. In some examples, the I/O components are configured to communicate with a computer network. For example, the I/O components may be configured to exchange data over a computer network using a variety of different physical connections, wireless connections, and protocols. The I/O components may include network interface components (e.g., a network interface controller), repeaters, network bridges, network switches, routers, and firewalls. In some examples, the I/O components include hardware, software, and/or firmware configured to communicate with various human interface devices, including display screens, keyboards, pointer devices (e.g., a mouse), touchscreens, speakers, and microphones. In some examples, the I/O components include hardware, software, and/or firmware configured to communicate with additional devices, such as external memory (e.g., external HDDs).

In some implementations, the search system 100 and/or content determination system 108 is a system of one or more computing devices (e.g., a computer search system) configured to implement the techniques described herein. Put another way, the features attributed to the modules and data stores described herein may be implemented by one or more computing devices. Each computing device may include any combination of electronic hardware, software, and/or firmware described above. For example, each computing device may include any combination of the processing units, memory components, I/O components, and interconnect components described above. The computing devices may also include various human interface devices, including display screens, keyboards, pointing devices (e.g., a mouse), touchscreens, speakers, and microphones. The computing devices may also be configured to communicate with additional devices, such as external memory (e.g., external HDDs).

The computing devices of the search system 100 and/or content determination system 108 may be configured to communicate with the network 106. The computing devices may also be configured to communicate with one another via a computer network. In some examples, the computing devices include one or more server computing devices configured to communicate with the user device(s) 102 (e.g., receive search queries 134 and content information 136 and transmit search results 138), gather data from the data source(s) 104, index the data, store the data, and store other documents or media. In some examples, the computing devices reside within one or more machines at a single geographic location. In other examples, the computing devices may be distributed across a number of geographic locations.

Additionally, the various implementations of the search system 100 and content determination system 108 described above (e.g., using one or more computing devices that include one or more processing units, memory components, I/O components, and interconnect components) are equally applicable to any of the user device(s) 102 and API(s) 120, as well as to the various components thereof, as described herein.

What is claimed is:

1. A method comprising:
    receiving a search query from a user device;
    determining one or more native application states of one or more native applications that are accessible by a user of the user device, wherein the determining includes:
        identifying a first set of the one or more native applications that require login credentials from the user device;
        for the first set, determining corresponding user login credentials associated with the user; and
        for each of the one or more applications, querying a corresponding application program interface (API) using at least one of: (i) the search query and (ii) the corresponding user login credentials;
    identifying one or more application state records based on: (i) the search query and (ii) the one or more native application states, wherein:
        each application state record includes an application access mechanism (AAM) and application state information (ASI);
        the AAM references a native application and indicates one or more operations for the native application to perform;
        the ASI describes a state of the native application after the native application has performed the one or more operations; and
        identifying the one or more application state records based on the one or more native application states comprises determining that the ASI included in each application state record describes one of the one or more native application states;
    selecting one or more AAMs from the identified one or more application state records; and
    transmitting the selected one or more AAMs to the user device.

2. The method of claim 1, wherein determining the one or more native application states that are accessible by the user of the user device comprises receiving an indication of the one or more native application states from one or more of the user device and a data store.

3. The method of claim 1, wherein determining the one or more native application states that are accessible by the user of the user device comprises:
    determining user login credentials associated with one or more native applications and the user;
    querying one or more application program interfaces (APIs) associated with the one or more native applications using the user login credentials; and
    determining the one or more native application states based on querying the one or more APIs.

4. The method of claim 1, wherein determining the one or more native application states that are accessible by the user of the user device and determining that the ASI included in each of the identified one or more application state records describes one of the one or more native application states comprises:
    for at least one of the identified one or more application state records, querying an application program interface (API) associated with the native application referenced by the AAM included in the application state record; and
    determining that the state of the native application described by the ASI included in the application state record is accessible by the user based on querying the API.

5. The method of claim 4, further comprising determining user login credentials associated with the native application referenced by the AAM included in the application state record and with the user, wherein querying the API associated with the native application comprises querying the API using the user login credentials.

6. The method of claim 1, wherein at least one of the identified one or more application state records includes an indication that the state described by the ASI included in the application state record is accessible by all users, and wherein determining the one or more native application states that are accessible by the user of the user device and determining that the ASI included in each of the identified one or more application state records describes one of the one or more native application states comprises determining that the state is accessible by the user based on the indication.

7. The method of claim 1, further comprising:
    for at least one of the identified one or more application state records, generating accessibility data that indicates that the state described by the ASI included in the application state record is accessible by the user of the user device within the native application referenced by the AAM included in the application state record; and
    transmitting the accessibility data to the user device.

8. The method of claim 1, wherein identifying the one or more application state records based on the search query comprises identifying each application state record based on one or more matches between one or more terms of the search query and one or more terms of the ASI included in the application state record.

9. A method comprising:
    receiving a search query from a user device;
    determining one or more native application states of one or more native applications that are accessible by a user of the user device, wherein the determining includes:
        identifying a first set of the one or more native applications that require login credentials from the user device;
        for the first set, determining corresponding user login credentials associated with the user; and for each of the one or more applications, querying a corresponding application program interface (API) using at least one of: (i) the search query and (ii) the corresponding user login credentials; and identifying one or more application state records based on: (i) the search query and (ii) the one or more native application states, wherein:

each application state record includes an application access mechanism (AAM) and application state information (ASI);

the AAM references a native application and indicates one or more operations for the native application to perform; and the ASI describes a state of the native application after the native application has performed the one or more operations;

generating a result score for each of the identified one or more application state records based on whether the ASI included in the application state record describes one of the one or more native application states;

ordering the identified one or more application state records based on the one or more result scores;

selecting one or more application state records from the ordered one or more application state records;

selecting one or more AAMs from the selected one or more application state records; and transmitting the selected one or more AAMs to the user device.

10. The method of claim 9, wherein determining the one or more native application states that are accessible by the user of the user device comprises one or more of:

receiving an indication of the one or more native application states from one or more of the user device and a data store;

determining user login credentials associated with one or more native applications and the user, querying one or more application program interfaces (APIs) associated with the one or more native applications using the user login credentials, and determining the one or more native application states based on querying the one or more APIs; and determining one or more additional native applications that do not require user login credentials for accessing states of the native applications, querying one or more additional APIs associated with the one or more additional native applications, and determining the one or more native application states based on querying the one or more additional APIs.

11. The method of claim 9, wherein determining the one or more native application states that are accessible by the user of the user device and generating the result score for each of the identified one or more application state records based on whether the ASI included in the application state record describes one of the one or more native application states comprises:

for at least one of the identified one or more application state records, querying an application program interface (API) associated with the native application referenced by the AAM included in the application state record;

determining whether the state of the native application described by the ASI included in the application state record is accessible by the user based on querying the API; and generating the result score for the application state record based on whether the state of the native application is accessible by the user.

12. The method of claim 11, further comprising determining user login credentials associated with the native application referenced by the AAM included in the application state record and with the user, wherein querying the API associated with the native application comprises querying the API using the user login credentials.

13. The method of claim 9, wherein at least one of the identified one or more application state records includes an indication that the state described by the ASI included in the application state record is accessible by all users, and wherein determining the one or more native application states that are accessible by the user of the user device and generating the result score for each of the identified one or more application state records based on whether the ASI included in the application state record describes one of the one or more native application states comprises determining that the state is accessible by the user based on the indication, and generating the result score for the application state record based on the state being accessible by the user.

14. The method of claim 9, wherein generating the result score for each of the identified one or more application state records comprises generating the result score using a machine-learned model comprising one of a gradient-boosted decision tree and a logistic probability formula.

15. The method of claim 9, further comprising:

for at least one of the selected one or more application state records, generating accessibility data that indicates whether the state described by the ASI included in the application state record is accessible by the user of the user device within the native application referenced by the AAM included in the application state record; and transmitting the accessibility data to the user device.

16. The method of claim 9, wherein identifying the one or more application state records based on the search query comprises identifying each application state record based on one or more matches between one or more terms of the search query and one or more terms of the ASI included in the application state record.

17. A method comprising:

transmitting, using a user device, a search query to a search system configured to generate search results in response to a received search query;

receiving search results from the search system at the user device in response to transmitting the search query, wherein:

the search results include one or more application access mechanisms (AAMs) that each reference a native application and indicate one or more operations for the native application to perform; and the native application performing the one or more operations sets the native application into a state of the native application;

identifying, using the user device, one or more native application states of one or more native applications that are accessible by a user of the user device, wherein the identifying includes:

identifying a first set of the one or more native applications that require login credentials from the user device;

for the first set, determining corresponding user login credentials associated with the user; and for each of the one or more applications, querying a corresponding application program interface (API) using at least one of: (i) the search query and (ii) the corresponding user login credentials;

for each of the one or more AAMs, determining, using the user device, whether the native application referenced by the AAM performing the one or more operations indicated by the AAM sets the native application into any of the one or more native application states; and displaying the one or more AAMs at the user device based on the determination.

18. The method of claim 17, wherein identifying the one or more native application states that are accessible by the user of the user device comprises one or more of:

receiving an indication of the one or more native application states from a data store;

determining user login credentials associated with one or more native applications and the user, querying one or more application program interfaces (APIs) associated with the one or more native applications using the user login credentials, and determining the one or more native application states based on querying the one or more APIs; and determining one or more additional native applications that do not require user login credentials for accessing states of the native applications, querying one or more additional APIs associated with the one or more additional native applications, and determining the one or more native application states based on querying the one or more additional APIs.

19. The method of claim 17, wherein identifying the one or more native application states that are accessible by the user of the user device comprises detecting the user obtaining access to at least one of the one or more native application states in one or more native applications that are installed on the user device.

20. The method of claim 17, wherein identifying the one or more native application states that are accessible by the user of the user device comprises accessing one or more native applications that are installed on the user device, and determining the one or more native application states based on accessing the one or more native applications.

21. The method of claim 17, wherein displaying the one or more AAMs based on the determination of whether the native application referenced by each AAM performing the one or more operations indicated by the AAM sets the native application into any of the one or more native application states comprises:

for each of the one or more AAMs that references a native application that, upon performing the one or more operations indicated by the AAM, is set into any of the one or more native application states, generating, using the user device, a user selectable link that includes the AAM and displaying the user selectable link on the user device; and for each of the one or more AAMs that references a native application that, upon performing the one or more operations indicated by the AAM, is not set into any of the one or more native application states, refraining from generating a user selectable link that includes the AAM and refraining from displaying the user selectable link on the user device.

22. The method of claim 17, wherein displaying the one or more AAMs based on the determination of whether the native application referenced by each AAM performing the one or more operations indicated by the AAM sets the native application into any of the one or more native application states comprises:

for at least one of the one or more AAMs that references a native application that, upon performing the one or more operations indicated by the AAM, is set into any of the one or more native application states, generating, using the user device, a user selectable link that includes the AAM and displaying the user selectable link relatively higher within a list on the user device; and for at least one of the one or more AAMs that references a native application that, upon performing the one or more operations indicated by the AAM, is not set into any of the one or more native application states, generating, using the user device, a user selectable link that includes the AAM and displaying the user selectable link relatively lower within the list on the user device.

23. The method of claim 17, further comprising:

for at least one of the one or more AAMs, determining, using the user device, accessibility data that indicates whether the native application referenced by the AAM performing the one or more operations indicated by the AAM sets the native application into a state of the native application that is accessible by the user of the user device within the native application;

generating, using the user device, a user selectable link that includes the AAM and the accessibility data; and displaying the user selectable link on the user device.

24. A system comprising:

one or more memory components configured to store computer-readable instructions; and one or more processing units configured to execute the computer-readable instructions, wherein the computer-readable instructions, when executed by the one or more processing units, cause the one or more processing units to:

receive a search query from a user device;

determine one or more native application states of one or more native applications that are accessible by a user of the user device, wherein the determination includes:

identifying a first set of the one or more native applications that require login credentials from the user device;

for the first set, determining corresponding user login credentials associated with the user; and for each of the one or more applications, querying a corresponding application program interface (API) using at least one of: (i) the search query and (ii) the corresponding user login credentials;

identify one or more application state records based on: (i) the search query and (ii) the one or more native application states, wherein:

each application state record includes an application access mechanism (AAM) and application state information (ASI):

the AAM references a native application and indicates one or more operations for the native application to perform;

the ASI describes a state of the native application after the native application has performed the one or more operations; and to identify the one or more application state records based on the one or more native application states, the one or more computing devices are configured to determine that the ASI included in each application state record describes one of the one or more native application states;

select one or more AAMs from the identified one or more application state records; and transmit the selected one or more AAMs to the user device.

25. A system comprising:
one or more memory components configured to store computer-readable instructions; and
one or more processing units configured to execute the computer-readable instructions, wherein the computer-readable instructions, when executed by the one or more processing units, cause the one or more processing units to:
receive a search query from a user device;
determine one or more native application states of one or more native applications that are accessible by a user of the user device, wherein the determination includes:
identifying a first set of the one or more native applications that require login credentials from the user device;
for the first set, determining corresponding user login credentials associated with the user; and
for each of the one or more applications, querying a corresponding application program interface (API) using at least one of: (i) the search query and (ii) the corresponding user login credentials; and
identify one or more application state records based on: (i) the search query and (ii) the one or more native application states, wherein:
each application state record includes an application access mechanism (AAM) and application state information (ASI);
the AAM references a native application and indicates one or more operations for the native application to perform; and
the ASI describes a state of the native application after the native application has performed the one or more operations;
generate a result score for each of the identified one or more application state records based on whether the ASI included in the application state record describes one of the one or more native application states;
order the identified one or more application state records based on the one or more result scores;
select one or more application state records from the ordered one or more application state records;
select one or more AAMs from the selected one or more application state records; and
transmit the selected one or more AAMs to the user device.

26. A system comprising:
one or more memory components configured to store computer-readable instructions; and
one or more processing units configured to execute the computer-readable instructions, wherein the computer-readable instructions, when executed by the one or more processing units, cause the one or more processing units to:
transmit, using a user device, a search query to a search system configured to generate search results in response to a received search query;
receive search results from the search system at the user device in response to transmitting the search query, wherein:
the search results include one or more application access mechanisms (AAMs) that each reference a native application and indicate one or more operations for the native application to perform; and
the native application performing the one or more operations sets the native application into a state of the native application;
identify, using the user device, one or more native application states of one or more native applications that are accessible by a user of the user device, wherein the identification includes:
identifying a first set of the one or more native applications that require login credentials from the user device;
for the first set, determining corresponding user login credentials associated with the user; and
for each of the one or more applications, querying a corresponding application program interface (API) using at least one of: (i) the search query and (ii) the corresponding user login credentials;
for each of the one or more AAMs, determine, using the user device, whether the native application referenced by the AAM performing the one or more operations indicated by the AAM sets the native application into any of the one or more native application states; and
display the one or more AAMs at the user device based on the determination.

* * * * *